US011595968B2

(12) United States Patent
Chou et al.

(10) Patent No.: US 11,595,968 B2
(45) Date of Patent: Feb. 28, 2023

(54) EDGE COMPUTING DEPLOYMENT SCENARIOS

(71) Applicant: Intel Corporation, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 17/256,025

(22) PCT Filed: Sep. 25, 2019

(86) PCT No.: PCT/US2019/053025
§ 371 (c)(1),
(2) Date: Dec. 24, 2020

(87) PCT Pub. No.: WO2020/069036
PCT Pub. Date: Apr. 2, 2020

(65) Prior Publication Data
US 2021/0176769 A1    Jun. 10, 2021

Related U.S. Application Data

(60) Provisional application No. 62/736,756, filed on Sep. 26, 2018.

(51) Int. Cl.
*H04W 4/00* (2018.01)
*H04W 72/08* (2009.01)
(Continued)

(52) U.S. Cl.
CPC ....... *H04W 72/085* (2013.01); *H04L 41/0806* (2013.01); *H04L 41/5003* (2013.01);
(Continued)

(58) Field of Classification Search
CPC ..... H04W 72/085; H04W 4/027; H04W 4/02; H04W 4/70; H04W 88/18; H04W 24/02;
(Continued)

(56) References Cited

U.S. PATENT DOCUMENTS

| 11,032,163 | B2* | 6/2021 | Venkataramu .......... H04L 43/20 |
| 2018/0139107 | A1 | 5/2018 | Senarath et al. |
| 2018/0192390 | A1 | 7/2018 | Li et al. |
| 2018/0241635 | A1 | 8/2018 | Rao et al. |
| 2019/0215729 | A1* | 7/2019 | Oyman ............... H04L 65/1016 |

(Continued)

FOREIGN PATENT DOCUMENTS

KR    20170088425 A    8/2017

OTHER PUBLICATIONS

Kekki, Sami, et al.; "MEC in 5G Networks," ETSI White Paper No. 28; Jun. 2018; 28 pages.
(Continued)

*Primary Examiner* — Phuongchau Ba Nguyen
(74) *Attorney, Agent, or Firm* — Alliance IP, LLC

(57) ABSTRACT

Technology is disclosed for a Third Generation Partnership Project (3GPP) management system operable for peer-to-peer (P2P) edge computing in a fifth generation (5G) computing network. The 3GPP management system can be configured to: identify a user plane function (UPF) based on quality of service (QoS) requirements. The 3GPP management system can be configured to request, from an edge computing management system, deployment of an application server (AS). The 3GPP management system can be configured to request a network functions virtualization (NFV) orchestrator (NFVO) to connect the UPF and the AS based on the QoS requirements.

13 Claims, 18 Drawing Sheets

(51) Int. Cl.
*H04L 41/0806* (2022.01)
*H04L 41/5003* (2022.01)
*H04L 67/10* (2022.01)
*H04L 67/00* (2022.01)
*H04W 4/02* (2018.01)

(52) U.S. Cl.
CPC .............. *H04L 67/10* (2013.01); *H04L 67/34* (2013.01); *H04W 4/027* (2013.01)

(58) Field of Classification Search
CPC ................. H04W 28/04; H04W 72/04; H04W 72/042; H04W 88/08; H04L 41/0806; H04L 41/5003; H04L 67/10; H04L 67/34; H04L 41/0895; H04L 41/40; H04L 67/12; H04L 5/0007
See application file for complete search history.

(56) References Cited

U.S. PATENT DOCUMENTS

| 2021/0144054 | A1* | 5/2021 | Chou .................. H04L 41/0803 |
| 2021/0144517 | A1* | 5/2021 | Guim Bernat ........ H04W 12/04 |
| 2022/0086072 | A1* | 3/2022 | Chou .................... H04W 28/16 |
| 2022/0086698 | A1* | 3/2022 | Yao ......................... H04L 43/20 |
| 2022/0132455 | A1* | 4/2022 | Gupta .................. H04W 60/00 |
| 2022/0159501 | A1* | 5/2022 | Chou .................... H04L 41/122 |

OTHER PUBLICATIONS

PCT International Preliminary Report on Patentability issued in PCT/US2019/053025, dated Mar. 23, 2021; 8 pages.
PCT International Search Report and Written Opinion issued in PCT/US2019/053025, dated Jan. 15, 2020; 9 pages.

* cited by examiner

EDGE COMPUTING DEPLOYMENT SCENARIOS

CROSS-REFERENCE TO RELATED APPLICATIONS

This application is a national stage application under 35 U.S.C. § 371 of PCT International Application Serial No. PCT/US2019/053025, filed on Sep. 25, 2019, and entitled "EDGE COMPUTING DEPLOYMENT SCENARIOS," which claims the benefit of U.S. Provisional Application No. 62/736,756, filed Sep. 26, 2018, each of which is hereby incorporated by reference herein in its entirety.

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB), next generation node Bs (gNB), or new radio base stations (NR BS) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
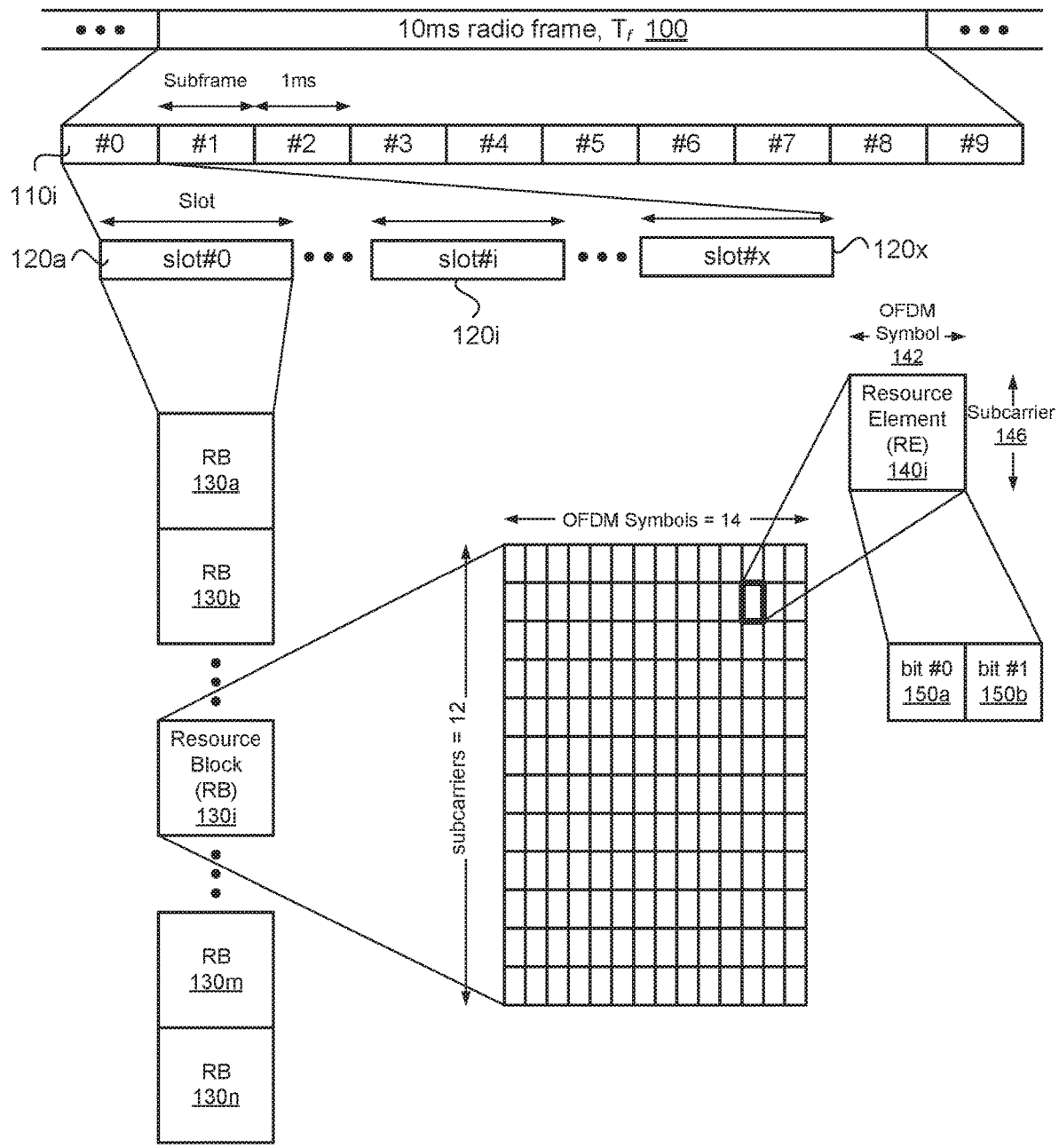
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Fifth Generation (5G) networks can support various services such as Internet of Things (IoT), Cloud-based services, industrial control, autonomous driving, mission critical communications, and the like, based on the network slicing technology. Some services, such as autonomous driving, can have ultra-low latency and high data capacity requests due to safety and performance concerns. 5GC system architecture, as defined in Third Generation Partnership Project (3GPP) Technical Specification (TS) 23.501, can support edge computing to enable such services by applications that are hosted closer to the user equipment's (UE's) access point of attachment in order to reduce the end-to-end latency and the load on the transport network.

The end-to-end (E2E) latency of the traffic traveling from UE to application server (AS) can include the latency both inside and outside the 3GPP networks. The latency within the 3GPP networks can be relevant to quality of service (QoS) requirements in 5G networks, while the latency outside the 3GPP networks can be related to the geographical locations of user plane function (UPF) and AS. Therefore, it can be helpful to deploy the AS and the UPF in an implementation that meets the end-to-end latency standards of the services.

In one example, operators can be enabled to deploy UPF and AS to support edge computing networks. In one example, edge computing deployment scenarios can include E2E operational support system (OSS) deployment and peer-to-peer (P2P) edge computing management deployment. In addition, three use cases and standards can be provided (e.g., 3GPP management system initiated deployment, non-3GPP management system initiated deployment, and E2E OSS deployment).

In one example, an apparatus of a Third Generation Partnership Project (3GPP) management system can be operable for peer-to-peer (P2P) edge computing in a fifth generation (5G) computing network. The apparatus can comprise: one or more processors. The one or more processors can be configured to: identify, at the 3GPP management system, a user plane function (UPF) based on quality of service (QoS) requirements; request, from an edge computing management system deployment of an application server (AS); and request, at the 3GPP management system, a network functions virtualization (NFV) orchestrator (NFVO) to connect the UPF and the AS based on the QoS requirements. The 3GPP management system can further comprise a memory interface configured to store the QoS requirements in a memory.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110*i* that are each 1 ms long. Each subframe can be further subdivided into one or multiple slots 120*a*, 120*i*, and 120*x*, each with a duration, $T_{slot}$, of 1/μ ms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130*a*, 130*b*, 130*i*, 130*m*, and 130*n* based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140*i* can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the NR BS to the UE, or the RB can be configured for an uplink transmission from the UE to the NR BS.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

Figure 2A:
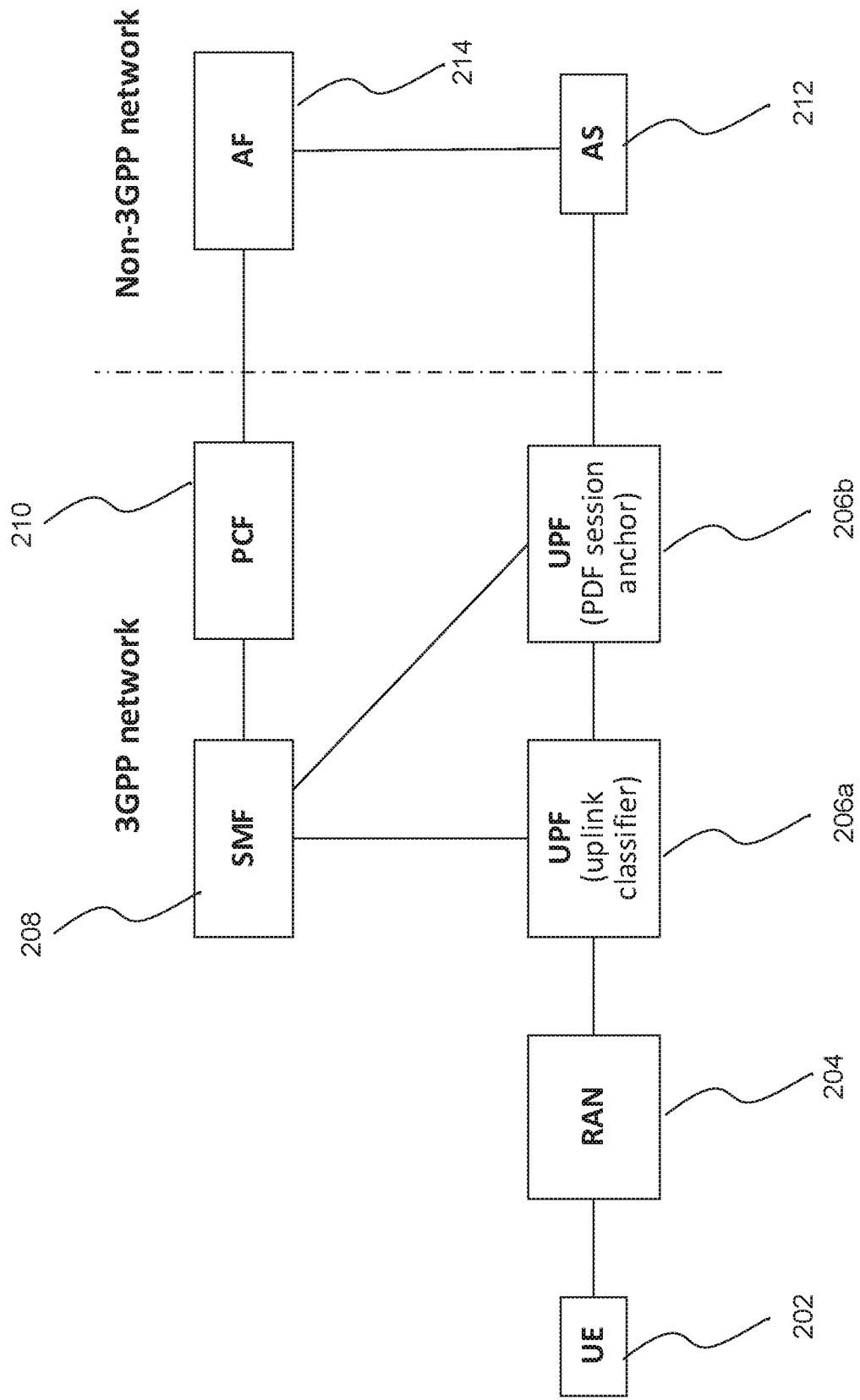
FIG. 2a illustrates a fifth generation (5G) edge computing network in accordance with an example.

In another example, as illustrated in FIG. 2*a*, 5G edge computing network architecture can include a 3GPP network (including a radio access network (RAN) 204) and a non-3GPP network. Edge computing can enable operator and 3rd party services to be hosted close to the UE's access point of attachment, so as to achieve an efficient service delivery through the reduced end-to-end latency and load on the transport network.

In another example, FIG. 2*a* illustrates how various 3GPP network elements can work with non-3GPP network elements, such as an Application Function (AF) 214 and an Application Server (AS) 212 to provide the services mentioned above. The AF 214 can send requests to a Session Management Function (SMF) 208 via a Policy Function (PCF) 210 or Network Exposure Function (NEF) to influence User Plane Function (UPF) 206*a* or 206*b* (re)selection and traffic routing. The various network elements in 2*a* can be the same or similar to corresponding network elements shown and described with regard the proceeding figures. The SMF 208 can insert an uplink classifier in UPF 206*a* to divert some user plane traffic from UE 202 to the local AS 212 in order to meet the ultra-low latency standards imposed by the service.

Edge Computing Deployment Scenarios

Figure 2B:
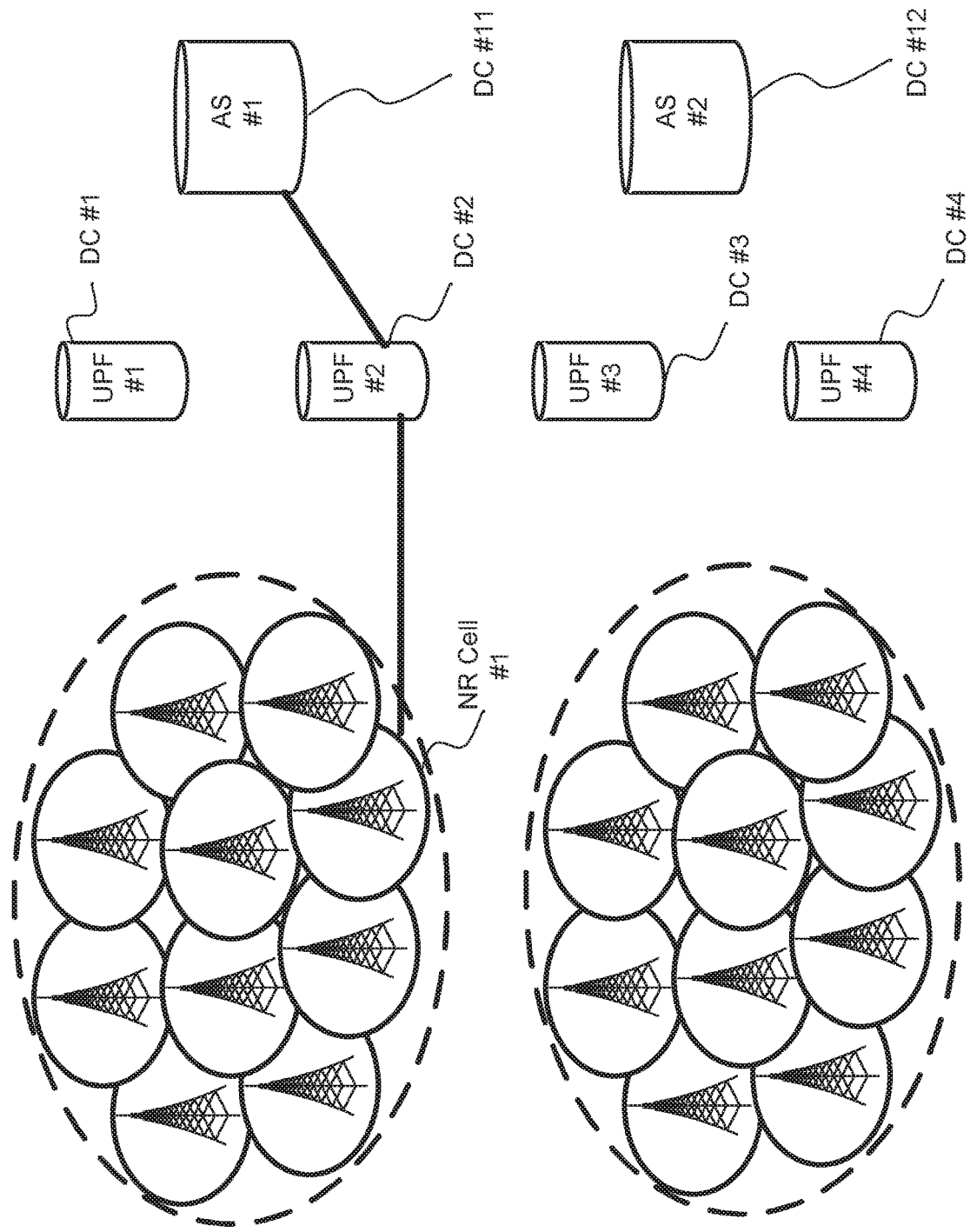
FIG. 2b illustrates edge computing deployment of new radio (NR) cells and data centers (DCs) in accordance with an example.

In another example, as illustrated in FIG. 2*b* an example of edge computing deployment can include new radio (NR) cells and data centers (DCs) DC #1-DC #4 and DC #11-DC #12 have been deployed. In one example, an edge computing application for UEs connected to NR cell #1 can be deployed. The edge computing application can select DC #2 to deploy user plane function (UPF) #2 and DC #11 to deploy AS #1 based on the quality of service (QoS) requirements between UEs. The AS #1 can be selected to meet the end-to-end (E2E) latency used by the application. The edge computing application can connect NR cell #1 to UPF #2, and UPF #2 to AS #1, as illustrated.

In another example, the deployment of network functions in 3GPP networks and non-3GPP networks to support edge computing can utilize communication between a 3GPP management system and a non-3GPP management system (e.g., European Telecommunications Standard Institute (ETSI) network functions virtualization (NFV) management and orchestration (MANO), ETSI multi-access edge computing (MEC), and the like).

E2E OSS Deployment Scenario

Figure 3A:
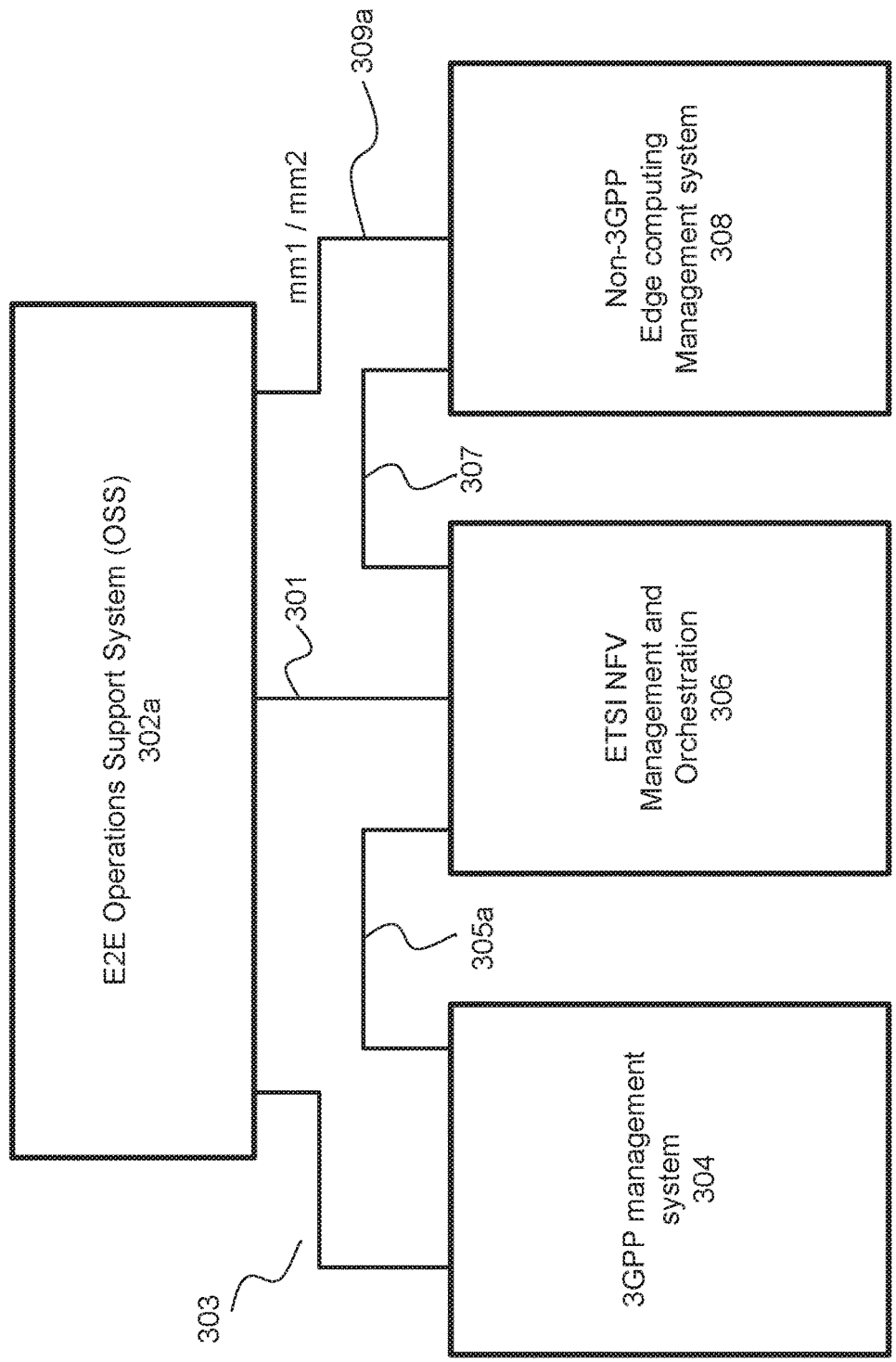
FIG. 3a depicts end-to-end (E2E) operations support system (OSS) deployment in accordance with an example.

In another example, as illustrated in FIG. 3a, an E2E Operations Support System (OSS) 302a can coordinate among a 3GPP management system 304, a non-3GPP edge computing (e.g., ETSI MEC) management system 308, and an ETSI NFV MANO 306 to support the deployment of edge computing in 3GPP networks.

In another example, the E2E OSS 302a can include information (e.g. e2e QoS requirements of edge computing applications, the topology of the UPF and AS, and the like) to deploy the edge computing network. The E2E OSS 302a can determine: the QoS requirements for 3GPP networks 304, derive the QoS requirements for non-3GPP networks 308 from E2E QoS requirements, and set up a connection between the UPF and the AS.

In another example, the E2E OSS 302a can be configured to communicate with: the 3GPP management system 304 via 303 to instantiate and configure the 3GPP NFs (e.g. UPF); the non-3GPP edge computing management system 308 via 309a to instantiate and configure the AS; and the NFVO 306 via 301 to establish and manage the connection between the UPF and AS, with the corresponding QoS requirements. The 3GPP management system 304 can be configured to communicate with the NFVO 306 via 305a. The non-3GPP edge computing management system 308 can be configured to communicate with the NFVO via 307.

Peer-to-Peer Edge Computing Management Deployment Scenario

Figure 3B:
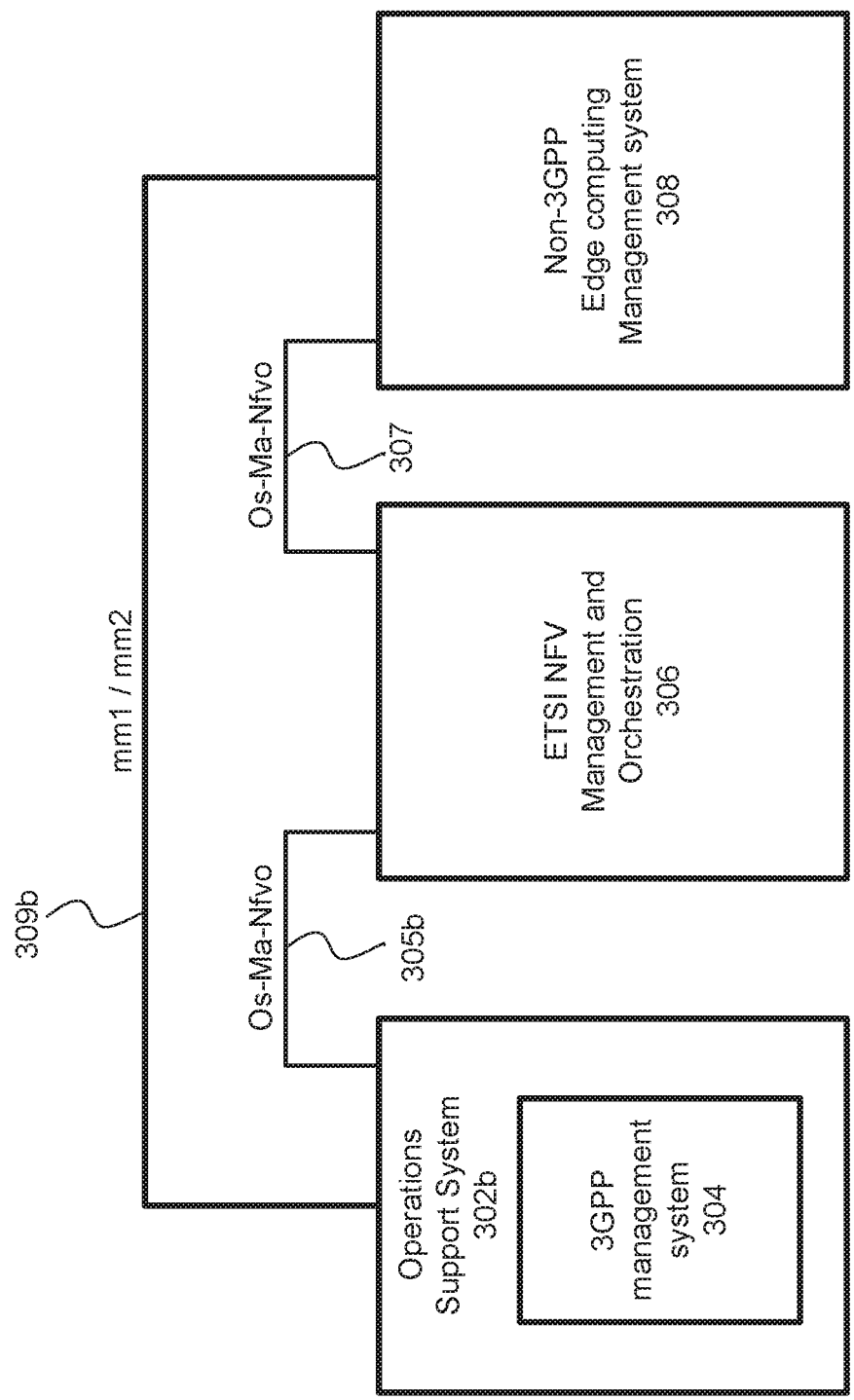
FIG. 3b depicts peer-to-peer (P2P) edge computing management deployment in accordance with an example.

In another example, as illustrated in FIG. 3b, peer-to-peer (P2P) edge computing management deployment can include deployment of edge computing in 3GPP networks. In this example, there can be communication among a 3GPP management system 304, non-3GPP edge computing management system 308, and ETSI NFV MANO 306.

In another example, the 3GPP management system can be integrated within an operations support system 302b. In another example, the 3GPP management system 304 can be configured to communicate with the non-3GPP edge computing management system 308 via 309b, and the 3GPP management system 304 can be configured to communicate with the NFVO 306 via 305b. In another example, the non-3GPP edge computing management system 308 can be configured to communicate with the 3GPP management system 304 via 309b, and the non-3GPP edge computing management system 308 can be configured to communicate with the NFVO 306 via 307.

In another example, the 3GPP management system 304 can initiate the edge computing deployment by requesting the non-3GPP edge computing management system 308 to deploy the AS. In another example, the 3GPP management system 304 can request the NFVO 306 to connect the UPF and AS with the QoS requirements for the connection (e.g. virtual link) between UPF and AS.

In another example, the non-3GPP edge computing management system 308 can initiate the edge computing deployment by requesting the 3GPP management system 304 to deploy the UPF. In another example, the non-3GPP edge computing management system 308 can request the NFVO 306 to connect the UPF and AS with the QoS requirements for the connection between UPF and AS.

3GPP Management System Initiated Deployment

In another example, the AS and the UPF can be deployed to support edge computing applications for UEs connected to NR cells located in a specific geographic area. The 3GPP management system can be configured to initiate the AS deployment in a non-3GPP edge computing networks based on the QoS requirements of UPF to AS connection.

In another example, the 3GPP management system can be configured to receive: the e2e QoS requirements of the edge computing application, and the location of the NR cells where UEs are connected to run the edge computing applications.

In another example, the 3GPP management system can be configured to divide the e2e QoS requirements into 3GPP network QoS requirements (e.g., UE to UPF connections) and non-3GPP network QoS requirements (e.g., UPF to AS connections).

In another example, the 3GPP management system can be configured to: select the data center where the UPF can be instantiated based on the 3GPP network QoS requirements and the location of NR cells, and interact with the NFVO to instantiate the UPF in that data center.

In another example, the 3GPP management system can be configured to request the non-3GPP edge computing management system to deploy the AS with the non-3GPP network QoS requirements, and the UPF information (e.g. the identifier of the UPF being instantiated, the location, or the data center where the UPF is hosted), after the UPF has been instantiated successfully.

In another example, the non-3GPP edge computing management system can be configured to: select the data center where the AS will be instantiated, based on the QoS requirements and UPF location, and interact with NFVO to instantiate the AS in such data center.

In another example, the non-3GPP edge computing management system can be configured to: respond to the 3GPP management system with the identifier of the AS being instantiated after the AS has been instantiated successfully.

In another example, the 3GPP management system can be configured to request the NFVO to connect the UPF to the AS based on the non-3GPP network QoS requirements.

In another example, the 3GPP management system can be configured to insert an uplink classifier in the UPF to divert some user plane traffic from UE to the AS.

In another example, UEs can be enabled to communicate with the AS to run the edge computing application.

Non-3GPP Management System Initiated Deployment

In another example, the UPF can be deployed to support edge computing applications for UEs connected to NR cells located in a specific area. The non-3GPP management system can initiate UPF deployment in 3GPP networks based on the QoS requirements of the AS to UPF connection.

In another example, the non-3GPP edge computing management system can be configured to: request the 3GPP management system to deploy the UPF based on the 3GPP networks QoS requirements and the AS information (e.g. the location or the data center where the AS is hosted, and the identifier of the AS).

In another example, the 3GPP management system can be configured to: select the data center where the UPF will be instantiated based on the QoS requirements and AS location, and interact with the NFVO to instantiate the UPF in that data center.

In another example, after the NFVO has responded to the 3GPP management system that the UPF has been instantiated successfully, the 3GPP management system can be configured to: (a) insert an uplink classifier in the UPF to divert some user plane traffic from UE to the new UPF, or (b) respond to the non-3GPP edge computing management system with the identifier of the UPF being instantiated. The non-3GPP edge computing management system can request the NFVO to connect the UPF to the AS based on the non-3GPP network's QoS requirements.

In another example, UEs can be enabled to communicate with the AS to run the edge computing application.

E2E OSS Initiated Deployment

In another example, the E2E OSS can be deployed. The AS and the UPF can be deployed to support edge computing applications for UEs connected to NR cells located in a specific area. The E2E OSS can be configured to identify the QoS requirements for 3GPP networks (e.g., UE to UPF connection) and non-3GPP networks (e.g., UPF to AS connection).

In another example, the E2E OSS can be configured to: request the 3GPP management system to deploy the UPF based on the 3GPP network's QoS requirements and the location of NR cells where the edge computing applications can be deployed.

In another example, the 3GPP management system can: select the data center where the UPF will be instantiated based on the 3GPP networks QoS requirements and the location of NR cells, and interact with the NFVO to instantiate the UPF in that data center.

In another example, after the NFVO responds that the UPF has been instantiated successfully, the 3GPP management system can be configured to: (a) insert an uplink classifier in the UPF to divert some user plane traffic from UE to the new UPF, or (b) respond to the E2E OSS with the identifier and the location of the UPF being instantiated after the UPF has been instantiated successfully.

In another example, the E2E OSS can request the non-3GPP edge computing management system to deploy the AS based on the non-3GPP network's QoS requirements and the UPF location.

In another example, the non-3GPP edge computing management system can select the data center where the AS will be instantiated based on the non-3GPP networks QoS requirements and UPF location, and the non-3GPP edge computing management system can interact with the NFVO to instantiate the AS in said data center.

In another example, the non-3GPP edge computing management system can respond to the E2E OSS with the identifier of the AS being instantiated after the NFVO responds that the AS has been instantiated successfully. In another example, the E2E OSS can request the NFVO to connect the UPF to the AS with the QoS configured for the service. In another example, UEs can be configured to communicate with the local AS to run the edge computing application.

Standards

REQ-ECM_CON-x: The 3GPP management system can be configured to allow a non-3GPP edge computing management system to deploy the UPF based on a 3GPP network QoS and the location of NR cells where UEs will be connected to communicate with the AS.

REQ-ECM_CON-y: The 3GPP management system can be configured to request a non-3GPP edge computing management system to deploy the AS based on a non-3GPP network QoS and UPF location.

REQ-ECM_CON-z: The 3GPP management system can be configured to insert an uplink classifier that diverts some user plane traffic from UE to the UPF.

REQ-ECM_CON-w: The 3GPP management system can be configured to allow the E2E OSS to deploy the UPF based on a 3GPP network QoS and the location of NR cells where UEs will be connected to communicate with the AS.

Example MEC Systems and Frameworks

Figure 4:
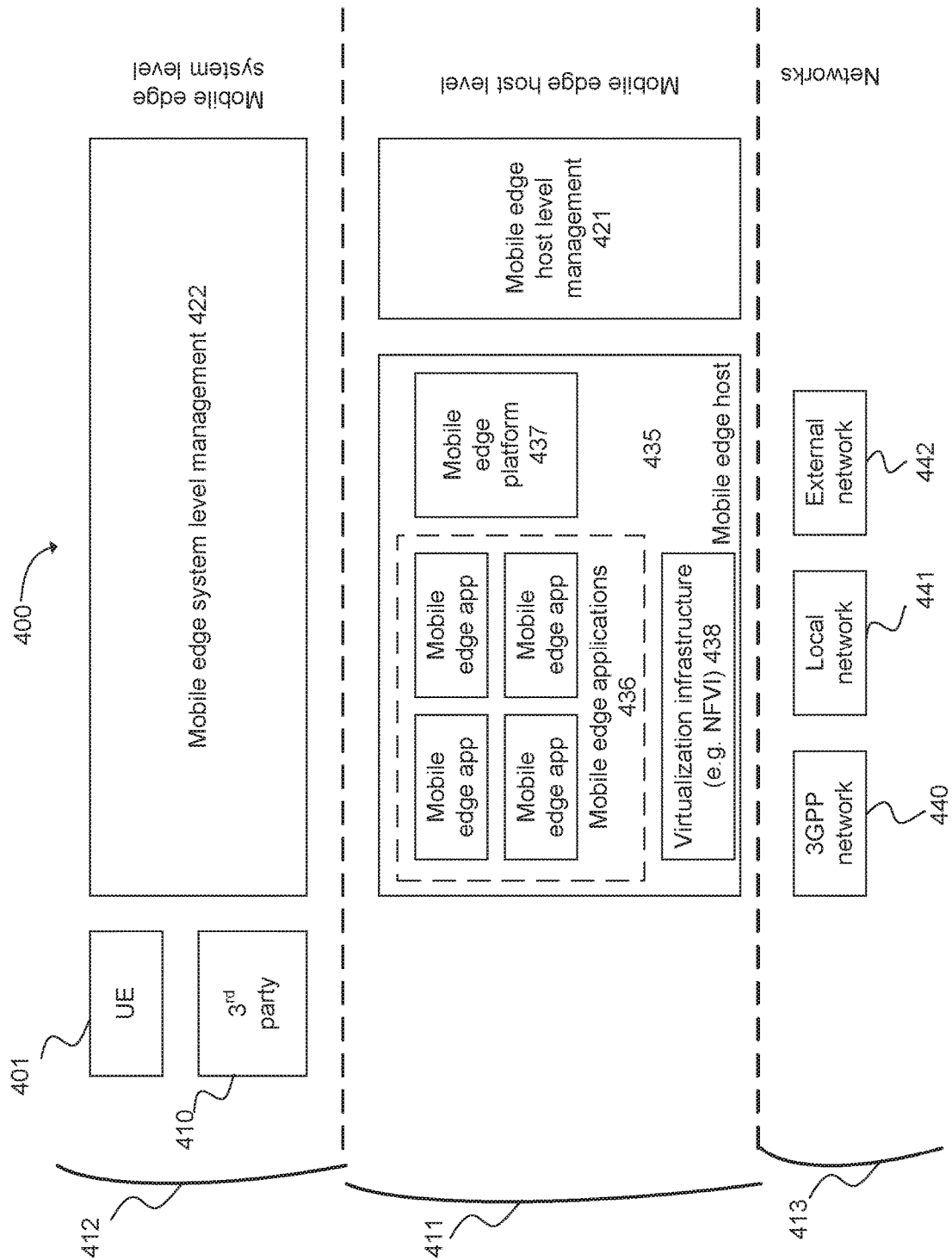
FIG. 4 illustrates multi-access edge computing (MEC) in accordance with an example.

FIG. 4 illustrates an example multi-access edge computing (MEC) framework 400 in accordance with some embodiments. The MEC framework 400 is an example structure of the MEC environment. MEC enables implementation of MEC applications 436 as software-only entities that run on top of a virtualization infrastructure 438, which is located in or close to the network edge. The MEC framework 400 shows the general entities involved, and these entities can be grouped into system level 412, host level 411, and network level 413 entities.

The MEC system level 412 includes MEC system level management 422, UE 401 (which may be the same or similar to the other UEs or terminals discussed herein), and 3$^{rd}$ Party entities 410. The MEC host level 411 includes MEC host level management 421 and MEC host 435. The MEC host 435 includes the MEC platform 437, MEC applications 436, and virtualization infrastructure 438. The network level 413 includes various external network level entities, such as a 3GPP network 440, a local network 441, and an external network 442. These entities are discussed in more detail with regard to FIG. 5.

Figure 5:
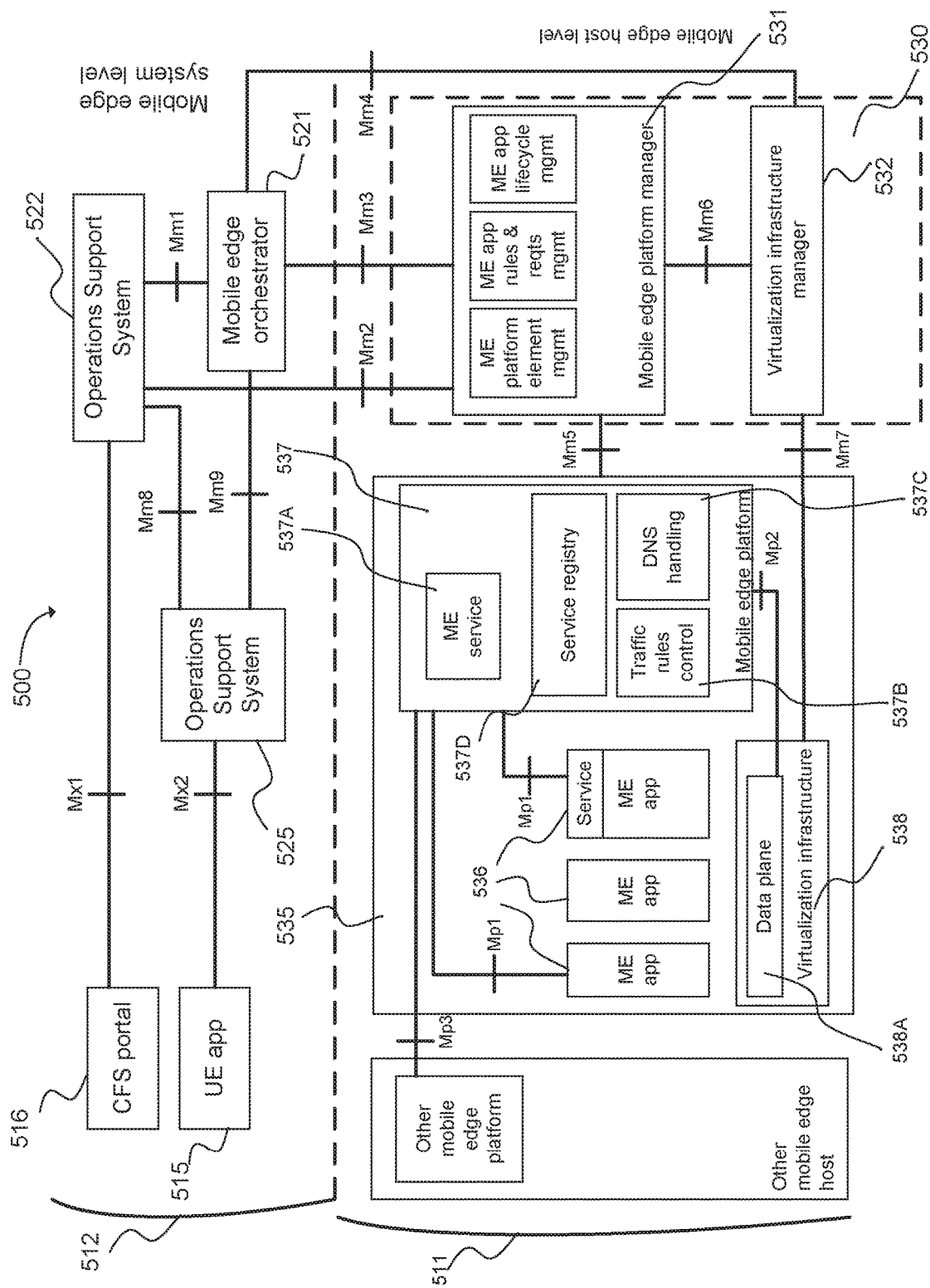
FIG. 5 illustrates multi-access edge computing (MEC) in accordance with an example.

FIG. 5 illustrates an example MEC system architecture in accordance with some embodiments. The MEC system 500 of FIG. 5 may include a MEC host level 511 and a MEC system level 512. The MEC host level 511 may include MEC hosts 535 and MEC management 530, which provide functionality to run MEC applications ("ME apps" or "MEC apps") 536 within an operator network or a subset of an operator network.

The MEC system 500 includes three groups of reference points, including "Mp" reference points regarding the MEC platform functionality; "Mm" reference points, which are management reference points; and "Mx" reference points, which connect MEC entities to external entities. The interfaces/reference points in the MEC system 500 may include internet protocol (IP) based connections, and may be used to provide Representational State Transfer (REST or RESTful) services, and the messages conveyed using the reference points/interfaces may be in XML, HTML, JSON, or some other desired format. A suitable Authentication, Authorization, and Accounting (AAA) protocol, such as the radius or diameter protocols, may also be used for communicating over the reference points/interfaces in other embodiments.

The MEC host 535 may be an entity that contains a MEC platform 537 and a virtualization infrastructure 538 which provides compute, storage, and network resources, for the purpose of running ME apps 536. The virtualization infrastructure 538 includes a data plane 538A that executes the traffic rules received by the MEC platform, and routes the traffic among applications (e.g., ME apps 536), ME services 537A, DNS server/proxy (see e.g., via DNS handling entity 537C), 3GPP network, local networks, and external networks.

The MEC platform 537 within the MEC host 535 may be a collection of functionality requested to run ME apps 536 on a particular virtualization infrastructure 538 and enable them to provide and consume MEC services 537A. The MEC platform 537 can also provide various services and/or functions, such as offering an environment where the ME apps 536 can discover, advertise, consume and offer MEC services 537A (discussed infra), including MEC services available via other platforms when supported. The MEC platform 537 may receive traffic rules from the MEC platform manager 531, applications, or services, and instruct the data plane accordingly (see e.g., Traffic Rules Control 537B). The MEC platform 537 may send instructions to the data plane 538A within the virtualization infrastructure 538 via the Mp2 reference point. The Mp2 reference point between the MEC platform 537 and the data plane 538A of the virtualization infrastructure 538 may be used to instruct the data plane 538A on how to route traffic among applications, networks, services, etc. In some implementations, the MEC platform 537 may translate tokens representing UEs in the traffic rules into specific internet protocol (IP) addresses. The MEC platform 537 may also receive DNS records from the MEC platform manager 531 and configure a DNS proxy/server accordingly. The MEC platform 537 may host MEC services 537A including the MEC services discussed infra, and provide access to persistent storage and time of day information. Furthermore, the MEC platform may communicate with other MEC platforms via the Mp3 reference point.

MEC apps 536 are instantiated on the virtualization infrastructure 538 of the MEC host 535 based on configuration or requests validated by the MEC management 530. ME apps 536 may run as virtual machines (VM) on top of the virtualization infrastructure 538 provided by the MEC host 535, and can interact with the MEC platform 537 to consume and provide MEC services 537A. In some embodiments, the ME apps 536 can also interact with the MEC platform 537 to perform certain support procedures related to the lifecycle of the ME apps 536, such as indicating availability, preparing relocation of user state, etc. The ME apps 536 may have a certain number of rules and standards associated to them, such as requested resources, maximum latency, requested or useful services, etc. These standards may be validated by the MEC system level management 530, and can be assigned to default values if missing.

A MEC service (ME service) 537A is a service provided and consumed either by the MEC platform 537 or a MEC application 536. When provided by an application, it can be registered in the list of services 537D to the MEC platform 537 over the Mp1 reference point. Additionally, the ME apps 536 can subscribe to one or more services 537A for which it is authorized over the Mp1 reference point.

As shown by FIG. 5, the Mp1 reference point is between the MEC platform 537 and the ME apps 536. The Mp1 reference point may provide service registration 537D, service discovery, and communication support for various services, such as the MEC services 537A. In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of ME services 537A may include radio network information services, location services, and bandwidth management services. Radio network information services, when available, may provide authorized ME apps 536 with radio network related information, and expose appropriate up-to-date radio network information to the ME apps 536. The radio network information may include, inter alia, radio network conditions, measurement and statistics information related to the user plane, information (e.g., UE context and radio access bearers) related to UEs served by the radio node(s) associated with the MEC host, changes on information related to UEs served by the radio node(s) associated with the MEC host, and/or the like. The radio network information may be provided at the relevant granularity (e.g., per UE, per cell, per period of time).

The location services, when available, may provide authorized ME apps 536 with location-related information, and expose such information to the ME apps 536. The location information may include, inter alia, the location of specific UEs currently served by the radio node(s) associated with the MEC host, information about the location of all UEs currently served by the radio node(s) associated with the MEC host, information about the location of a certain category of UEs currently served by the radio node(s) associated with the MEC host, a list of UEs in a particular location, information about the location of all radio nodes currently associated with the MEC host, and/or the like. The location information may be in the form of a geolocation, a Global Navigation Satellite Service (GNSS) coordinate, a Cell identity (ID), and/or the like.

The bandwidth management services (BWMS) may allow allocation of bandwidth to certain traffic routed to and from ME apps 536, and specify static/dynamic up/down bandwidth resources, including bandwidth size and bandwidth priority. ME apps 536 may use the BWMS to update/receive bandwidth information to/from the MEP 537. In some embodiments, different ME apps 536 running in parallel on the same MEC host 535 may be allocated specific static, dynamic up/down bandwidth resources, including bandwidth size and bandwidth priority. The BWMS may include a bandwidth management (BWM) API to allowed registered applications to statically and/or dynamically register for specific bandwidth allocations per session/application. The BWM API may include HTTP protocol bindings for BWM functionality using RESTful services or some other suitable API mechanism.

Figure 6A:
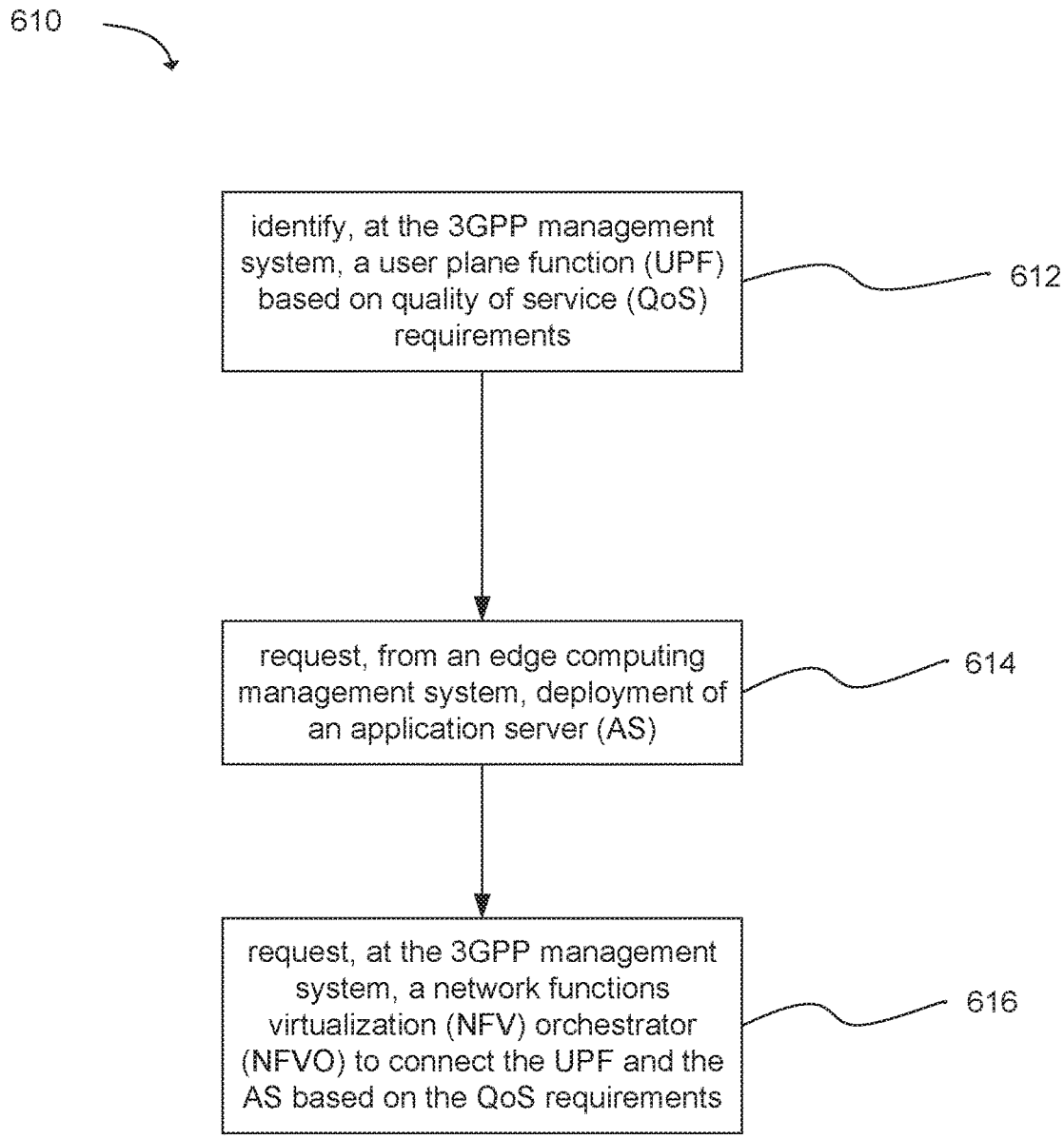
FIG. 6a depicts functionality of a Third Generation Partnership Project (3GPP) management system operable for peer-to-peer (P2P) edge computing in accordance with an example.

Another example provides functionality 610 of a Third Generation Partnership Project (3GPP) management system operable for peer-to-peer (P2P) edge computing in a fifth generation (5G) computing network, as shown in FIG. 6a. The 3GPP management system can comprise one or more processors. The one or more processors can be configured to identify, at the 3GPP management system, a user plane function (UPF) based on quality of service (QoS) requirements, as in block 612. The one or more processors can be configured to request, from an edge computing management system, deployment of an application server (AS), as in block 614. The one or more processors can be configured to request, at the 3GPP management system, a network functions virtualization (NFV) orchestrator (NFVO) to connect the UPF and the AS based on the QoS requirements, as in block 616. In addition, the 3GPP management system can comprise a memory interface configured to store the QoS requirements in a memory.

Figure 6B:
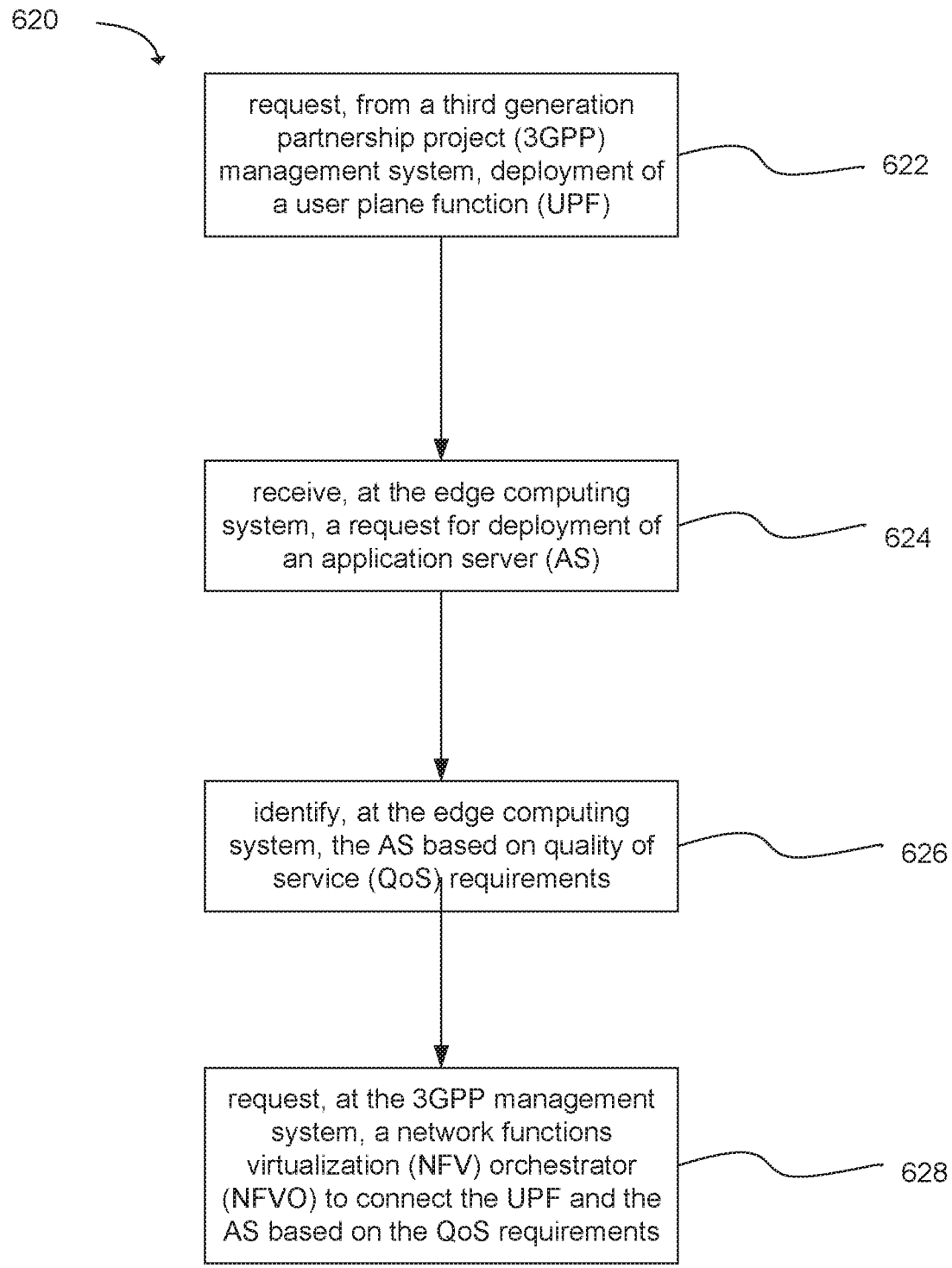
FIG. 6b depicts functionality of an edge computing system operable for peer-to-peer (P2P) edge computing in accordance with an example.

Another example provides functionality 620 of an edge computing system operable for peer-to-peer (P2P) edge computing in a fifth generation (5G) computing network, as shown in FIG. 6b. The edge computing system can comprise one or more processors. The one or more processors can be configured to request, from a third generation partnership project (3GPP) management system, deployment of a user plane function (UPF), as in block 622. The one or more processors can be configured to receive, at the edge computing system, a request for deployment of an application server (AS), as in block 624. The one or more processors can be configured to identify, at the edge computing system, the AS based on quality of service (QoS) requirements, as in block 626. The one or more processors can be configured to request, at the 3GPP management system, a network functions virtualization (NFV) orchestrator (NFVO) to connect the UPF and the AS based on the QoS requirements. In addition, the edge computing system can comprise a memory interface configured to store the QoS requirements in a memory.

Figure 6C:
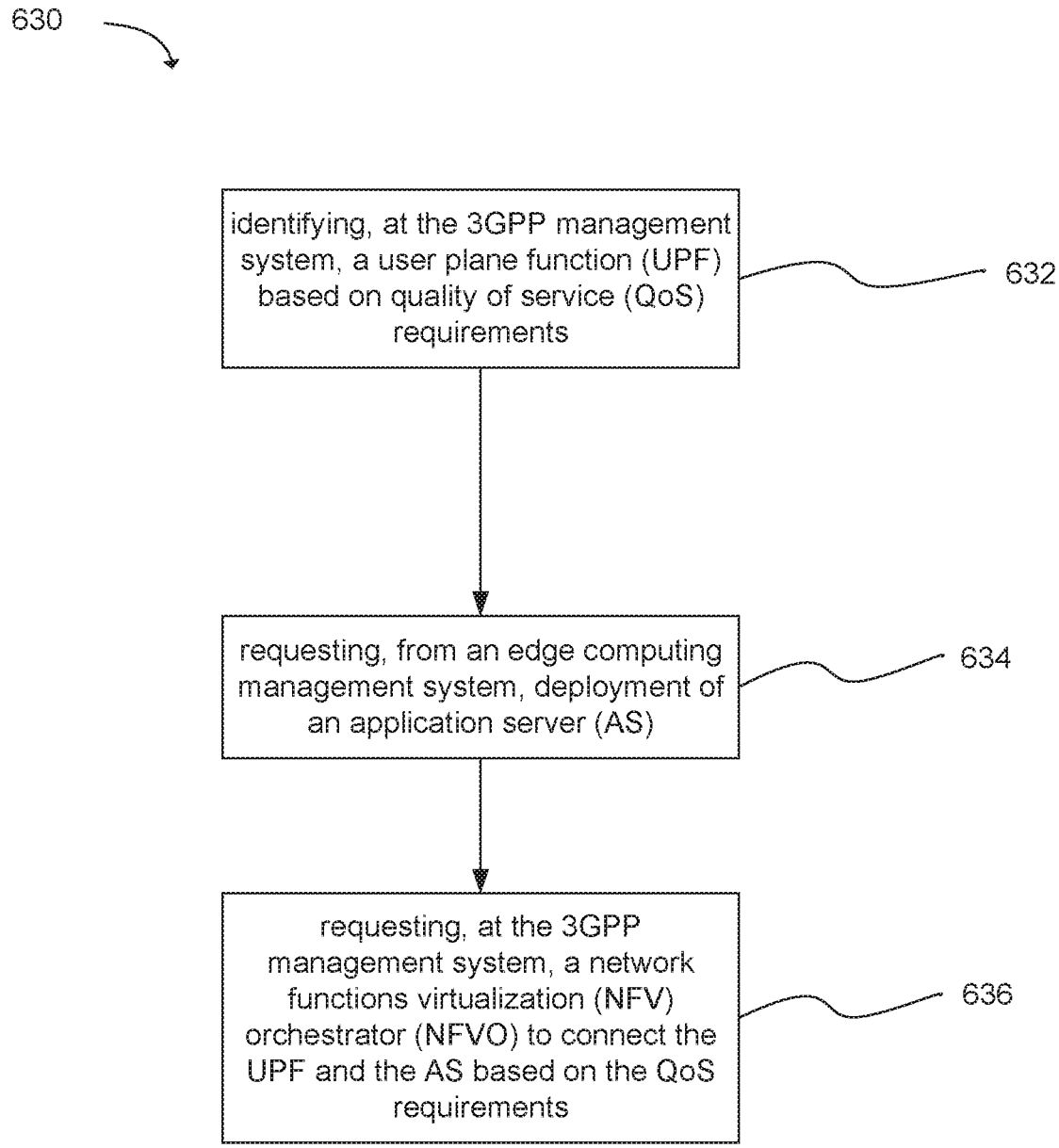
FIG. 6c depicts a flowchart of a machine readable storage medium having instructions embodied thereon for a Third Generation Partnership Project (3GPP) management system operable for edge computing in accordance with an example.

Another example provides at least one machine readable storage medium having instructions 630 embodied thereon for edge computing in a fifth generation (5G) computing network, as shown in FIG. 6c. The instructions can be executed on a machine, where the instructions are included on at least one computer readable medium or one non-transitory machine readable storage medium. The instructions when executed perform: identifying, at the 3GPP management system, a user plane function (UPF) based on quality of service (QoS) requirements, as in block 632. The instructions when executed perform: requesting, from an edge computing management system, deployment of an application server (AS), as in block 634. The instructions when executed perform: requesting, at the 3GPP management system, a network functions virtualization (NFV) orchestrator (NFVO) to connect the UPF and the AS based on the QoS requirements, as in block 636.

While examples have been provided in which a gNB has been specified, they are not intended to be limiting. An evolved node B (eNB), a next generation node B (gNB), a new radio node B (gNB), or a new radio base station (NR BS) can be used in place of a gNB. Accordingly, unless otherwise stated, any example herein in which a gNB has been disclosed, can similarly be disclosed with the use of an eNB, gNB, or new radio base station (NR BS).

Figure 7:
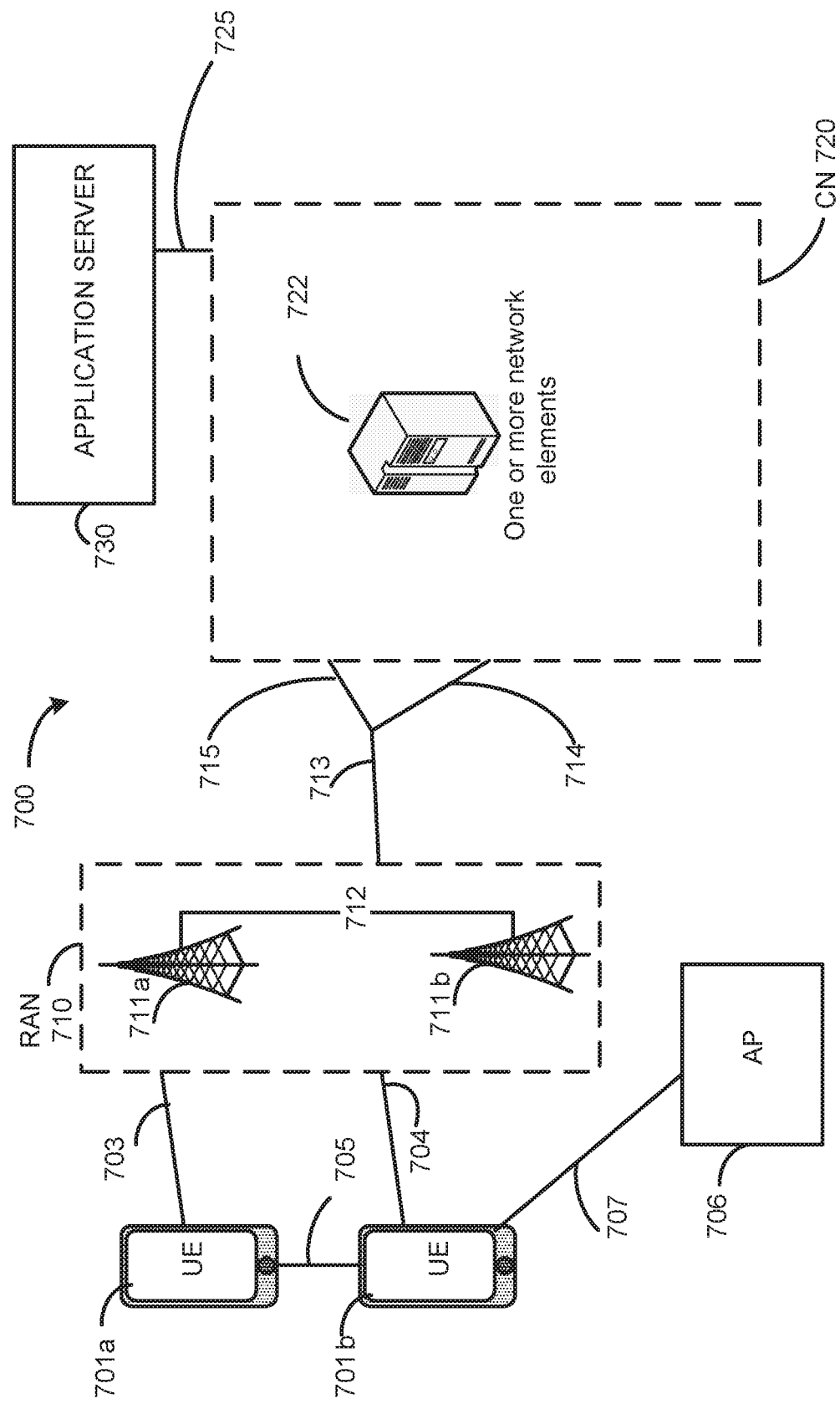
FIG. 7 illustrates an example architecture of a system of a network in accordance with an example.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with an or RAN 710. In embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs, and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications requested for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulations.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as requested, while changing the PCC may request the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701b within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 711 may be configured to communicate with one another via interface 712. In embodiments where the system 700 is an LTE system, the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system, the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED)

including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMEs.

Figure 8:
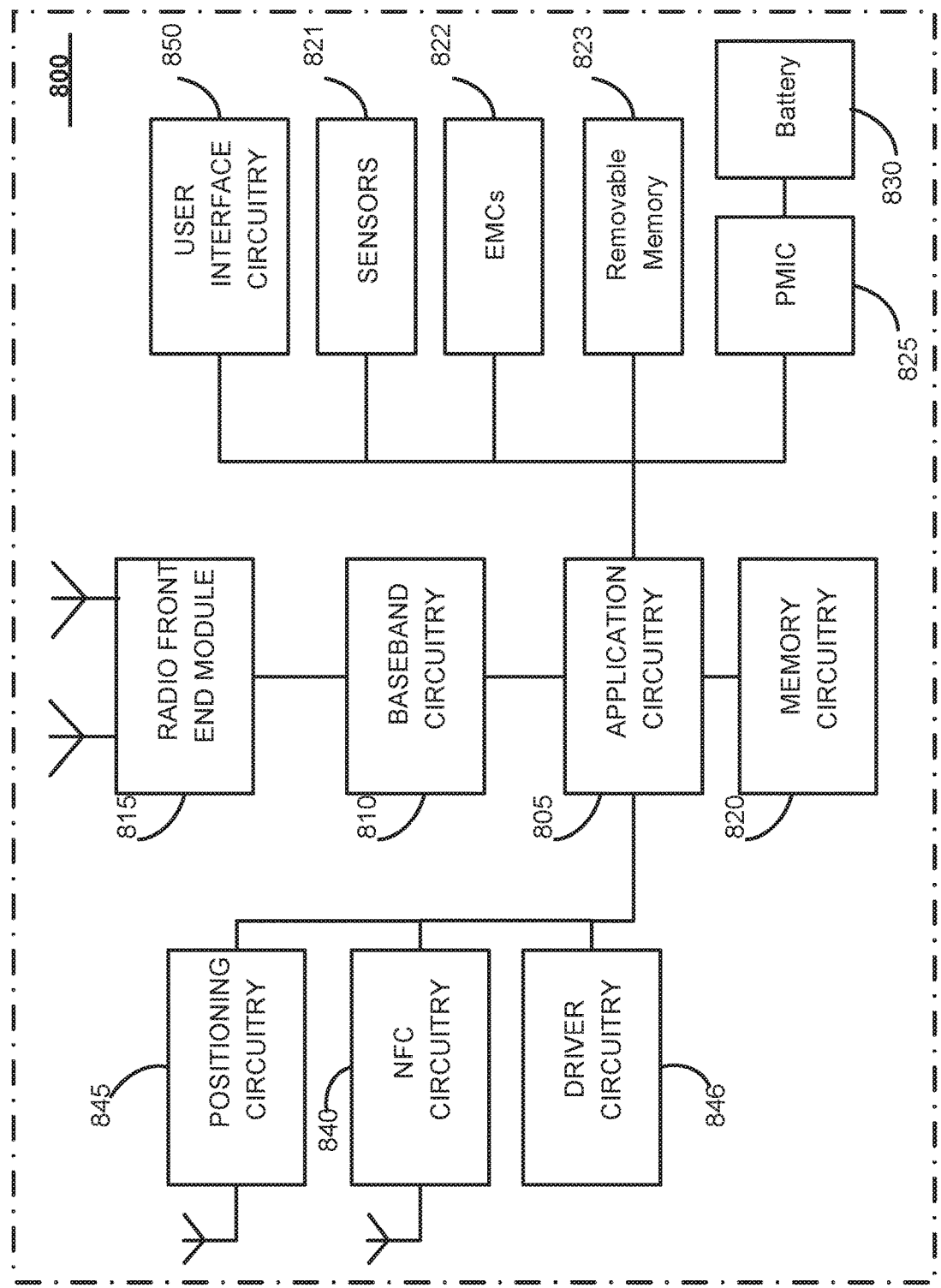
FIG. 8 illustrates an example of a platform or device in accordance with an example.

FIG. 8 illustrates an example of a platform 800 (or "device 800") in accordance with various embodiments. In embodiments, the computer platform 800 may be suitable for use as UEs 701, application servers 730, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 9.

The RFEMs 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signalling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 701.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current requested. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 9:
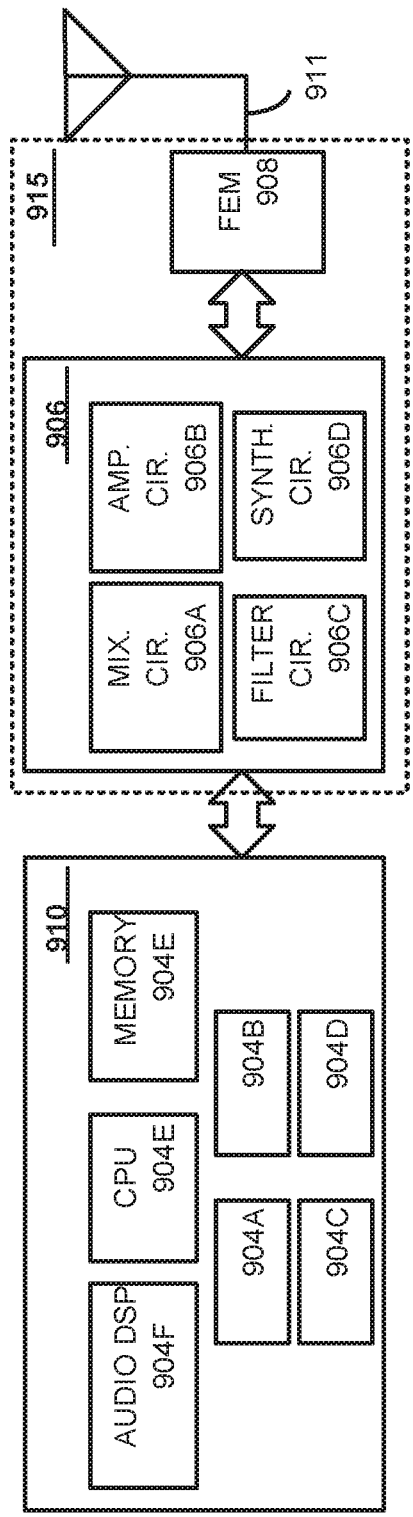
FIG. 9 illustrates example components of baseband circuitry and radio front end modules (RFEM) in accordance with an example.

FIG. 9 illustrates example components of baseband circuitry 910 and radio front end modules (RFEM) 915 in accordance with various embodiments. The baseband circuitry 910 corresponds to the baseband circuitry 810 of FIG. 8, respectively. The RFEM 915 corresponds to the RFEM 815 of FIG. 8, respectively. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 805 (see FIG. 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 805 of FIG. 9); an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 805 depending on the desired output frequency. In some embodiments, a divider control input (e.g., N) may be determined from a look-up table based on a channel indicated by the application circuitry 805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
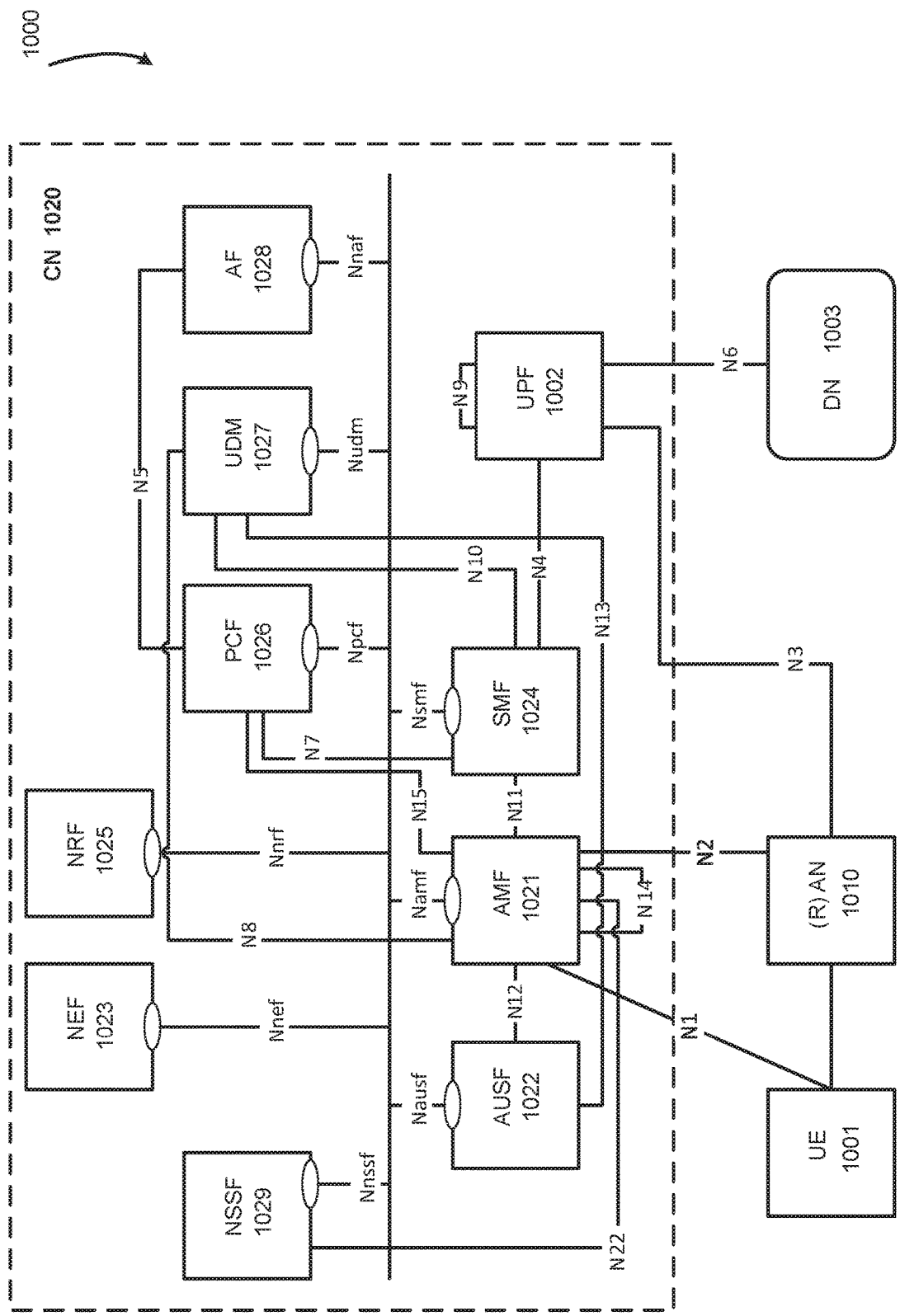
FIG. 10 illustrates an architecture of a system including a second core network (CN) in accordance with an example.

FIG. 10 illustrates an architecture of a system 1000 including a second CN 1020 in accordance with various embodiments. The system 1000 is shown to include a UE 1001, which may be the same or similar to the UEs discussed previously; a (R)AN 1010, which may be the same or similar to the RAN discussed previously, and which may include RAN nodes; and a DN 1003, which may be, for example, operator services, Internet access or 3rd party services; and a 5G C 1020. The 5GC 1020 may include an AUSF 1022; an AMF 1021; a SMF 1024; a NEF 1023; a PCF 1026; a NRF 1025; a UDM 1027; an AF 1028; a UPF 1002; and a NSSF 1029.

The UPF 1002 may act as an anchor point for intra-RAT and inter-RAT mobility, an external PDU session point of interconnect to DN 1003, and a branching point to support multi-homed PDU session. The UPF 1002 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1002 may include an uplink classifier to support routing traffic flows to a data network. The DN 1003 may represent various network operator services, Internet access, or third party services. DN 1003 may include, or be similar to, application server XQ30 discussed previously. The UPF 1002 may interact with the SMF 1024 via an N4 reference point between the SMF 1024 and the UPF 1002.

The AUSF 1022 may store data for authentication of UE 1001 and handle authentication-related functionality. The AUSF 1022 may facilitate a common authentication framework for various access types. The AUSF 1022 may communicate with the AMF 1021 via an N12 reference point between the AMF 1021 and the AUSF 1022; and may communicate with the UDM 1027 via an N13 reference point between the UDM 1027 and the AUSF 1022. Additionally, the AUSF 1022 may exhibit an Nausf service-based interface.

The AMF 1021 may be responsible for registration management (e.g., for registering UE 1001, etc.), connection management, reachability management, mobility management, and lawful interception of AMF-related events, and access authentication and authorization. The AMF 1021 may be a termination point for the an N11 reference point between the AMF 1021 and the SMF 1024. The AMF 1021 may provide transport for SM messages between the UE 1001 and the SMF 1024, and act as a transparent proxy for routing SM messages. AMF 1021 may also provide transport for SMS messages between UE 1001 and an SMSF (not shown by FIG. 10). AMF 1021 may act as SEAF, which may include interaction with the AUSF 1022 and the UE 1001, receipt of an intermediate key that was established as a result of the UE 1001 authentication process. Where USIM based authentication is used, the AMF 1021 may retrieve the security material from the AUSF 1022. AMF 1021 may also include a SCM function, which receives a key from the SEA that it uses to derive access-network specific keys. Furthermore, AMF 1021 may be a termination point of a RAN CP interface, which may include or be an N2 reference point between the (R)AN 1010 and the AMF 1021; and the AMF 1021 may be a termination point of NAS (N1) signalling, and perform NAS ciphering and integrity protection.

AMF 1021 may also support NAS signalling with a UE 1001 over an N3 IWF interface. The N3IWF may be used to provide access to untrusted entities. N3IWF may be a termination point for the N2 interface between the (R)AN 1010 and the AMF 1021 for the control plane, and may be a termination point for the N3 reference point between the (R)AN 1010 and the UPF 1002 for the user plane. As such, the AMF 1021 may handle N2 signalling from the SMF 1024 and the AMF 1021 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 1001 and AMF 1021 via an N1 reference point between the UE 1001 and the AMF 1021, and relay uplink and downlink user-plane packets between the UE 1001 and UPF 1002. The N3IWF also provides mechanisms for IPsec tunnel establishment with the UE 1001. The AMF 1021 may exhibit an Namf service-based interface, and may be a termination point for an N14 reference point between two AMFs 1021 and an N17 reference point between the AMF 1021 and a 5G-EIR (not shown by FIG. 10).

The UE 1001 may need to register with the AMF 1021 in order to receive network services. RM is used to register or deregister the UE 1001 with the network (e.g., AMF 1021), and establish a UE context in the network (e.g., AMF 1021). The UE 1001 may operate in an RM-REGISTERED state or an RM-DEREGISTERED state. In the RM-DEREGISTERED state, the UE 1001 is not registered with the network, and the UE context in AMF 1021 holds no valid location or routing information for the UE 1001 so the UE 1001 is not reachable by the AMF 1021. In the RM-REGISTERED state, the UE 1001 is registered with the network, and the UE context in AMF 1021 may hold a valid location or routing information for the UE 1001 so the UE 1001 is reachable by the AMF 1021. In the RM-REGISTERED state, the UE 1001 may perform mobility Registration Update procedures, perform periodic Registration Update procedures triggered by expiration of the periodic update timer (e.g., to notify the network that the UE 1001 is still active), and perform a Registration Update procedure to update UE capability information or to re-negotiate protocol parameters with the network, among others.

The AMF 1021 may store one or more RM contexts for the UE 1001, where each RM context is associated with a specific access to the network. The RM context may be a data structure, database object, etc. that indicates or stores, inter alia, a registration state per access type and the periodic update timer. The AMF 1021 may also store a 5GC MM context that may be the same or similar to the (E)MM context discussed previously. In various embodiments, the AMF 1021 may store a CE mode B Restriction parameter of the UE 1001 in an associated MM context or RM context. The AMF 1021 may also derive the value, when needed, from the UE's usage setting parameter already stored in the UE context (and/or MM/RM context).

CM may be used to establish and release a signaling connection between the UE 1001 and the AMF 1021 over the N1 interface. The signaling connection is used to enable NAS signaling exchange between the UE 1001 and the CN 1020, and comprises both the signaling connection between the UE and the AN (e.g., RRC connection or UE-N3IWF connection for non-3GPP access) and the N2 connection for the UE 1001 between the AN (e.g., RAN 1010) and the AMF 1021. The UE 1001 may operate in one of two CM states, CM-IDLE mode or CM-CONNECTED mode. When the UE 1001 is operating in the CM-IDLE state/mode, the UE 1001 may have no NAS signaling connection established with the AMF 1021 over the N1 interface, and there may be (R)AN 1010 signaling connection (e.g., N2 and/or N3 connections) for the UE 1001. When the UE 1001 is operating in the CM-CONNECTED state/mode, the UE 1001 may have an established NAS signaling connection with the AMF 1021 over the N1 interface, and there may be a (R)AN 1010 signaling connection (e.g., N2 and/or N3 connections) for the UE 1001. Establishment of an N2 connection between the (R)AN 1010 and the AMF 1021 may cause the UE 1001 to transition from CM-IDLE mode to CM-CONNECTED mode, and the UE 1001 may transition from the CM-CONNECTED mode to the CM-IDLE mode when N2 signaling between the (R)AN 1010 and the AMF 1021 is released.

The SMF 1024 may be responsible for SM (e.g., session establishment, modify and release, including tunnel maintain between UPF and AN node); UE IP address allocation and management (including authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1001 and a data network (DN) 1003 identified by a Data Network Name (DNN). PDU sessions may be established upon UE 1001 request, modified upon UE 1001 and 5GC 1020 request, and released upon UE 1001 and 5GC 1020 request using NAS SM signaling exchanged over the N1 reference point between the UE 1001 and the SMF 1024. Upon request from an application server, the 5GC 1020 may trigger a specific application in the UE 1001. In response to receipt of the trigger message, the UE 1001 may pass the trigger message (or relevant parts/information of the trigger message) to one or more identified applications in the UE 1001. The identified application(s) in the UE 1001 may establish a PDU session to a specific DNN. The SMF 1024 may check whether the UE 1001 requests are compliant with user subscription information associated with the UE 1001. In this regard, the SMF 1024 may retrieve and/or request to receive update notifications on SMF 1024 level subscription data from the UDM 1027.

The SMF 1024 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 1024 may be included in the system 1000, which may be between another SMF 1024 in a visited network and the SMF 1024 in the home network in roaming scenarios. Additionally, the SMF 1024 may exhibit the Nsmf service-based interface.

The NEF 1023 may provide means for securely exposing the services and capabilities provided by 3GPP network functions for third party, internal exposure/re-exposure, Application Functions (e.g., AF 1028), edge computing or fog computing systems, etc. In such embodiments, the NEF 1023 may authenticate, authorize, and/or throttle the AFs. NEF 1023 may also translate information exchanged with the AF 1028 and information exchanged with internal network functions. For example, the NEF 1023 may translate between an AF-Service-Identifier and an internal 5GC information. NEF 1023 may also receive information from other network functions (NFs) based on exposed capabilities of other network functions. This information may be stored at the NEF 1023 as structured data, or at a data storage NF using standardized interfaces. The stored information can then be re-exposed by the NEF 1023 to other NFs and AFs, and/or used for other purposes such as analytics. Additionally, the NEF 1023 may exhibit an Nnef service-based interface.

The NRF 1025 may support service discovery functions, receive NF discovery requests from NF instances, and provide the information of the discovered NF instances to the NF instances. NRF 1025 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1025 may exhibit the Nnrf service-based interface.

The PCF 1026 may provide policy rules to control plane function(s) to enforce them, and may also support unified policy framework to govern network behaviour. The PCF 1026 may also implement an FE to access subscription information relevant for policy decisions in a UDR of the UDM 1027. The PCF 1026 may communicate with the AMF 1021 via an N15 reference point between the PCF 1026 and the AMF 1021, which may include a PCF 1026 in a visited network and the AMF 1021 in case of roaming scenarios. The PCF 1026 may communicate with the AF 1028 via an N5 reference point between the PCF 1026 and the AF 1028; and with the SMF 1024 via an N7 reference point between the PCF 1026 and the SMF 1024. The system 1000 and/or CN 1020 may also include an N24 reference point between the PCF 1026 (in the home network) and a PCF 1026 in a visited network. Additionally, the PCF 1026 may exhibit an Npcf service-based interface.

The UDM 1027 may handle subscription-related information to support the network entities' handling of communication sessions, and may store subscription data of UE 1001. For example, subscription data may be communicated between the UDM 1027 and the AMF 1021 via an N8 reference point between the UDM 1027 and the AMF. The UDM 1027 may include two parts, an application FE and a UDR (the FE and UDR are not shown by FIG. 10). The UDR may store subscription data and policy data for the UDM 1027 and the PCF 1026, and/or structured data for exposure and application data (including PFDs for application detection, application request information for multiple UEs 1001) for the NEF 1023. The Nudr service-based interface may be exhibited by the UDR 221 to allow the UDM 1027, PCF 1026, and NEF 1023 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1024 via an N10 reference point between the UDM 1027 and the SMF 1024. UDM 1027 may also support SMS management, wherein an SMS-FE implements the similar application logic as discussed previously. Additionally, the UDM 1027 may exhibit the Nudm service-based interface.

The AF 1028 may provide application influence on traffic routing, provide access to the NCE, and interact with the policy framework for policy control. The NCE may be a mechanism that allows the 5GC 1020 and AF 1028 to provide information to each other via NEF 1023, which may be used for edge computing implementations. In such implementations, the network operator and third party services may be hosted close to the UE 1001 access point of attachment to achieve an efficient service delivery through the reduced end-to-end latency and load on the transport network. For edge computing implementations, the 5GC may select a UPF 1002 close to the UE 1001 and execute traffic steering from the UPF 1002 to DN 1003 via the N6 interface. This may be based on the UE subscription data, UE location, and information provided by the AF 1028. In this way, the AF 1028 may influence UPF (re)selection and traffic routing. Based on operator deployment, when AF 1028 is considered to be a trusted entity, the network operator may permit AF 1028 to interact directly with relevant NFs. Additionally, the AF 1028 may exhibit an Naf service-based interface.

The NSSF 1029 may select a set of network slice instances serving the UE 1001. The NSSF 1029 may also determine allowed NSSAI and the mapping to the subscribed S-NSSAIs, if needed. The NSSF 1029 may also determine the AMF set to be used to serve the UE 1001, or a list of candidate AMF(s) 1021 based on a suitable configuration and possibly by querying the NRF 1025. The selection of a set of network slice instances for the UE 1001 may be triggered by the AMF 1021 with which the UE 1001 is registered by interacting with the NSSF 1029, which may lead to a change of AMF 1021. The NSSF 1029 may interact with the AMF 1021 via an N22 reference point between AMF 1021 and NSSF 1029; and may communicate with another NSSF 1029 in a visited network via an N31 reference point (not shown by FIG. 10). Additionally, the NSSF 1029 may exhibit an Nnssf service-based interface.

As discussed previously, the CN 1020 may include an SMSF, which may be responsible for SMS subscription checking and verification, and relaying SM messages to/from the UE 1001 to/from other entities, such as an SMS-GMSC/IWMSC/SMS-router. The SMS may also interact with AMF 1021 and UDM 1027 for a notification procedure that the UE 1001 is available for SMS transfer (e.g., set a UE not reachable flag, and notifying UDM 1027 when UE 1001 is available for SMS).

The CN 1020 may also include other elements that are not shown by FIG. 10, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 10). Individual NFs may share a UDSF for storing their respective unstructured data or individual NFs may each have their own UDSF located at or near the individual NFs. Additionally, the UDSF may exhibit an Nudsf service-based interface (not shown by FIG. 10). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 10 for clarity. In one example, the CN 1020 may include an Nx interface, which is an inter-CN interface between the MME and the AMF 1021 in order to enable interworking between two CNs. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 11:
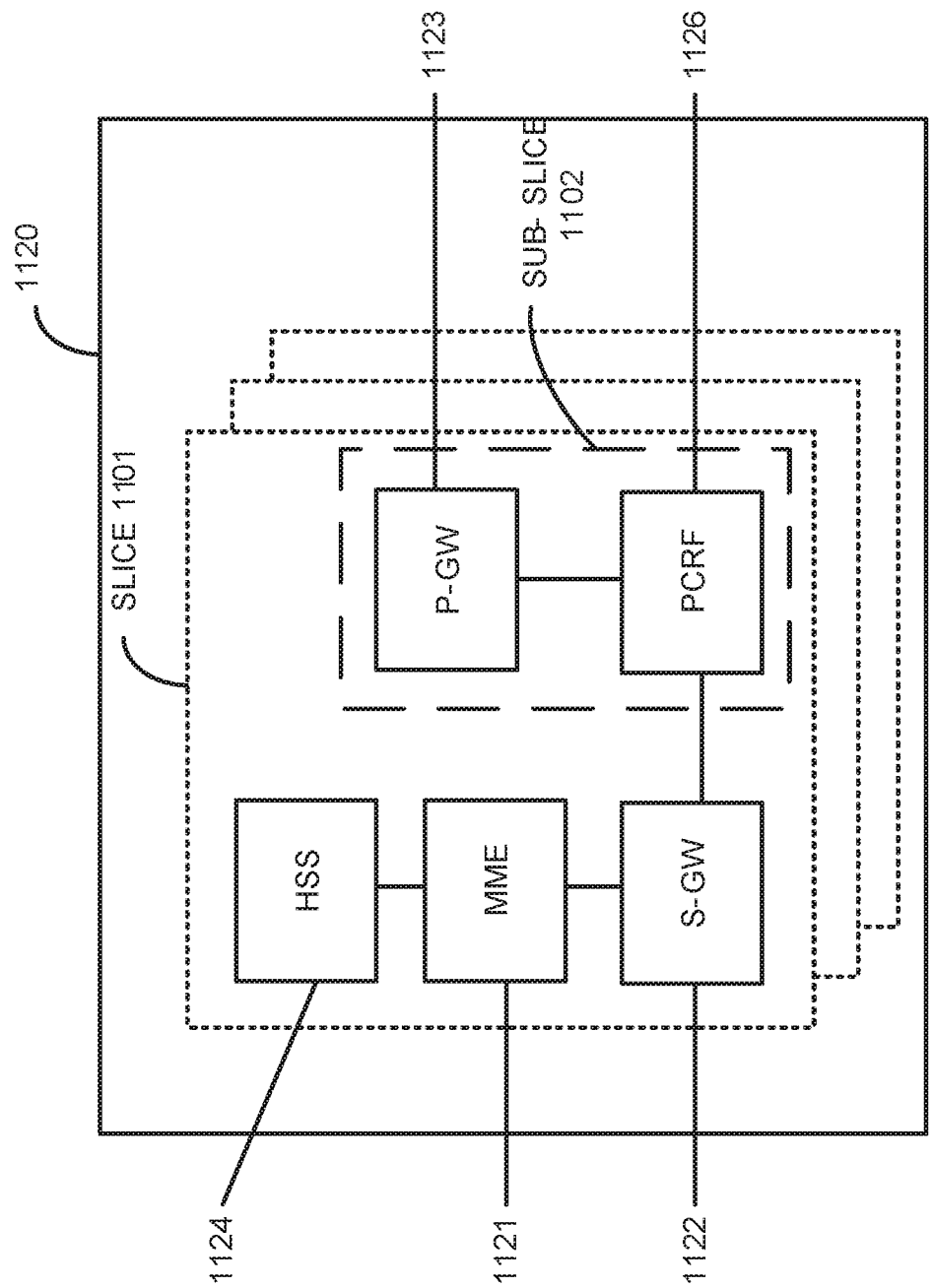
FIG. 11 illustrates components of a core network (CN) in accordance with an example.

FIG. 11 illustrates components of a core network in accordance with various embodiments. The components of the CN 1120 may be implemented in one physical node or separate physical nodes including components to read and execute instructions from a machine-readable or computer-readable medium (e.g., a non-transitory machine-readable storage medium). In embodiments, the components of CN 1120 may be implemented in a same or similar manner as discussed herein with regard to the components of CN 1020. In some embodiments, NFV is utilized to virtualize any or all of the above-described network node functions via executable instructions stored in one or more computer-readable storage mediums (described in further detail below). A logical instantiation of the CN 1120 may be referred to as a network slice 1101, and individual logical instantiations of the CN 1120 may provide specific network capabilities and network characteristics. A logical instantiation of a portion of the CN 1120 may be referred to as a network sub-slice 1102 (e.g., the network sub-slice 1102 is shown to include the P-GW 1123 and the PCRF 1126).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) requested to deploy the network slice.

With respect to 5G systems (see, e.g., FIG. 10), a network slice always comprises a RAN part and a CN part. The support of network slicing relies on the principle that traffic for different slices is handled by different PDU sessions. The network can realize the different network slices by scheduling and also by providing different L1/L2 configurations. The UE 1001 provides assistance information for network slice selection in an appropriate RRC message, if it has been provided by NAS. While the network can support large number of slices, the UE need not support more than 8 slices simultaneously.

A network slice may include the CN 1020 control plane and user plane NFs, NG-RANs 1010 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 1001 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 1021 instance serving an individual UE 1001 may belong to each of the network slice instances serving that UE.

Network Slicing in the NG-RAN 1010 involves RAN slice awareness. RAN slice awareness includes differentiated handling of traffic for different network slices, which have been pre-configured. Slice awareness in the NG-RAN 1010 is introduced at the PDU session level by indicating the S-NSSAI corresponding to a PDU session in all signaling that includes PDU session resource information. How the NG-RAN 1010 supports the slice enabling in terms of NG-RAN functions (e.g., the set of network functions that comprise each slice) is implementation dependent. The NG-RAN 1010 selects the RAN part of the network slice using assistance information provided by the UE 1001 or the 5GC 1020, which unambiguously identifies one or more of the pre-configured network slices in the PLMN. The NG-RAN 1010 also supports resource management and policy enforcement between slices as per SLAs. A single NG-RAN node may support multiple slices, and the NG-RAN 1010 may also apply an appropriate RRM policy for the SLA in place to each supported slice. The NG-RAN 1010 may also support QoS differentiation within a slice.

The NG-RAN 1010 may also use the UE assistance information for the selection of an AMF 1021 during an initial attach, if available. The NG-RAN 1010 uses the assistance information for routing the initial NAS to an AMF 1021. If the NG-RAN 1010 is unable to select an AMF 1021 using the assistance information, or the UE 1001 does not provide any such information, the NG-RAN 1010 sends the NAS signaling to a default AMF 1021, which may be among a pool of AMFs 1021. For subsequent accesses, the UE 1001 provides a temp ID, which is assigned to the UE 1001 by the 5GC 1020, to enable the NG-RAN 1010 to route the NAS message to the appropriate AMF 1021 as long as the temp ID is valid. The NG-RAN 1010 is aware of, and can reach, the AMF 1021 that is associated with the temp ID. Otherwise, the method for initial attach applies.

The NG-RAN 1010 supports resource isolation between slices. NG-RAN 1010 resource isolation may be achieved by means of RRM policies and protection mechanisms that should avoid that shortage of shared resources if one slice breaks the service level agreement for another slice. In some implementations, it is possible to fully dedicate NG-RAN 1010 resources to a certain slice. How NG-RAN 1010 supports resource isolation is implementation dependent.

Some slices may be available in part of the network. Awareness in the NG-RAN 1010 of the slices supported in the cells of its neighbors may be beneficial for inter-frequency mobility in connected mode. The slice availability may not change within the UE's registration area. The NG-RAN 1010 and the 5GC 1020 are responsible to handle a service request for a slice that may or may not be available in a given area. Admission or rejection of access to a slice may depend on factors such as support for the slice, availability of resources, support of the requested service by NG-RAN 1010.

The UE 1001 may be associated with multiple network slices simultaneously. In case the UE 1001 is associated with multiple slices simultaneously, one signaling connection is maintained, and for intra-frequency cell reselection, the UE 1001 tries to camp on the best cell. For inter-frequency cell reselection, dedicated priorities can be used to control the frequency on which the UE 1001 camps. The 5GC 1020 is to validate that the UE 1001 has the rights to access a network slice. Prior to receiving an Initial Context Setup Request message, the NG-RAN 1010 may be allowed to apply some provisional/local policies, based on awareness of a particular slice that the UE 1001 is requesting to access. During the initial context setup, the NG-RAN 1010 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
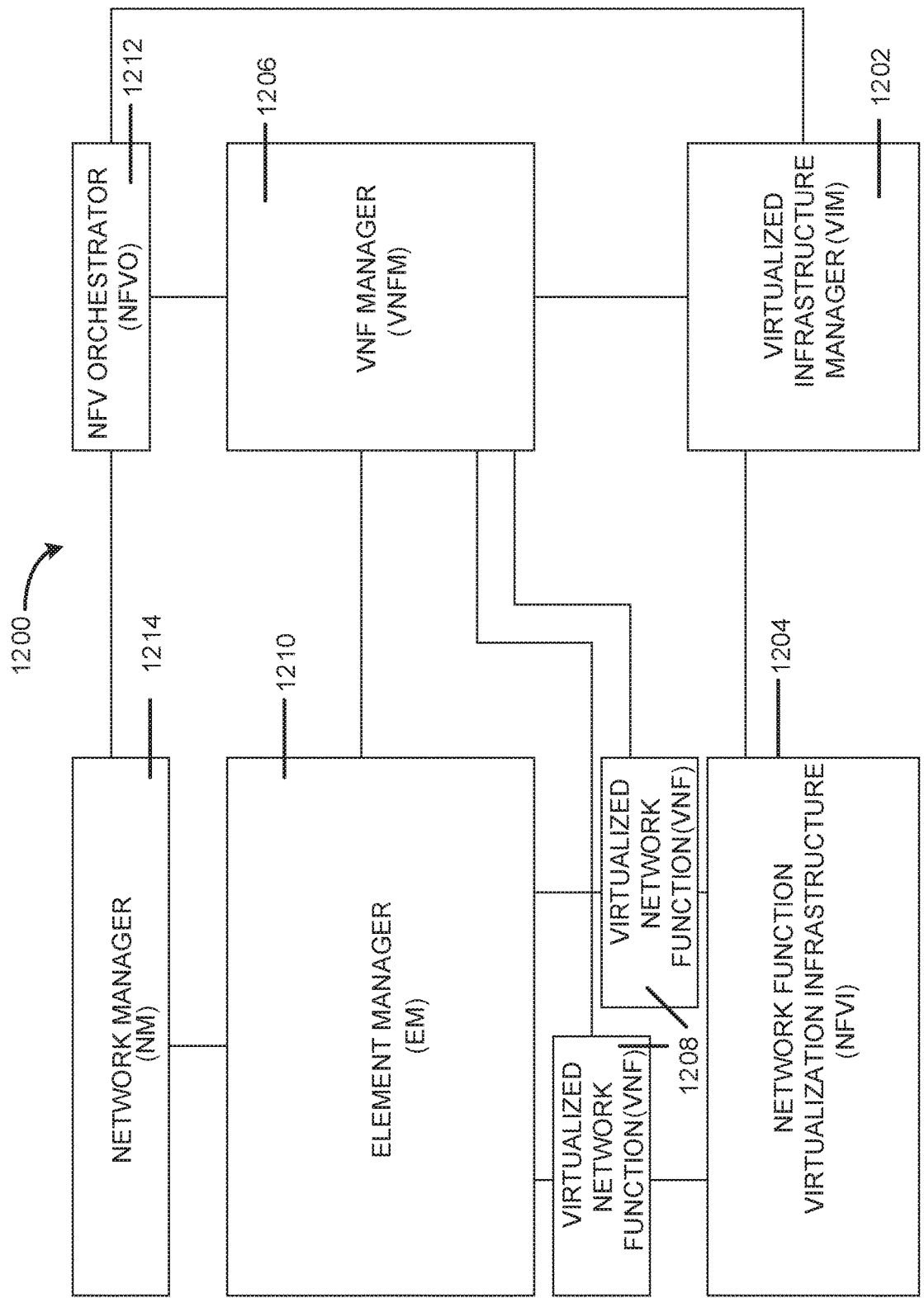
FIG. 12 illustrates components of a system to support network function virtualization (NFV) in accordance with an example.

FIG. 12 is a block diagram illustrating components, according to some example embodiments, of a system 1200 to support NFV. The system 1200 is illustrated as including a VIM 1202, an NFVI 1204, an VNFM 1206, VNFs 1208, an EM 1210, an NFVO 1212, and a NM 1214.

The VIM 1202 manages the resources of the NFVI 1204. The NFVI 1204 can include physical or virtual resources and applications (including hypervisors) used to execute the system 1200. The VIM 1202 may manage the life cycle of virtual resources with the NFVI 1204 (e.g., creation, maintenance, and tear down of VMs associated with one or more physical resources), track VM instances, track performance, fault and security of VM instances and associated physical resources, and expose VM instances and associated physical resources to other management systems.

The VNFM 1206 may manage the VNFs 1208. The VNFs 1208 may be used to execute EPC components/functions. The VNFM 1206 may manage the life cycle of the VNFs 1208 and track performance, fault and security of the virtual aspects of VNFs 1208. The EM 1210 may track the performance, fault and security of the functional aspects of VNFs 1208. The tracking data from the VNFM 1206 and the EM 1210 may comprise, for example, PM data used by the VIM 1202 or the NFVI 1204. Both the VNFM 1206 and the EM 1210 can scale up/down the quantity of VNFs of the system 1200.

The NFVO 1212 may coordinate, authorize, release and engage resources of the NFVI 1204 in order to provide the requested service (e.g., to execute an EPC function, component, or slice). The NM 1214 may provide a package of end-user functions with the responsibility for the management of a network, which may include network elements with VNFs, non-virtualized network functions, or both (management of the VNFs may occur via the EM 1210).

Figure 13:
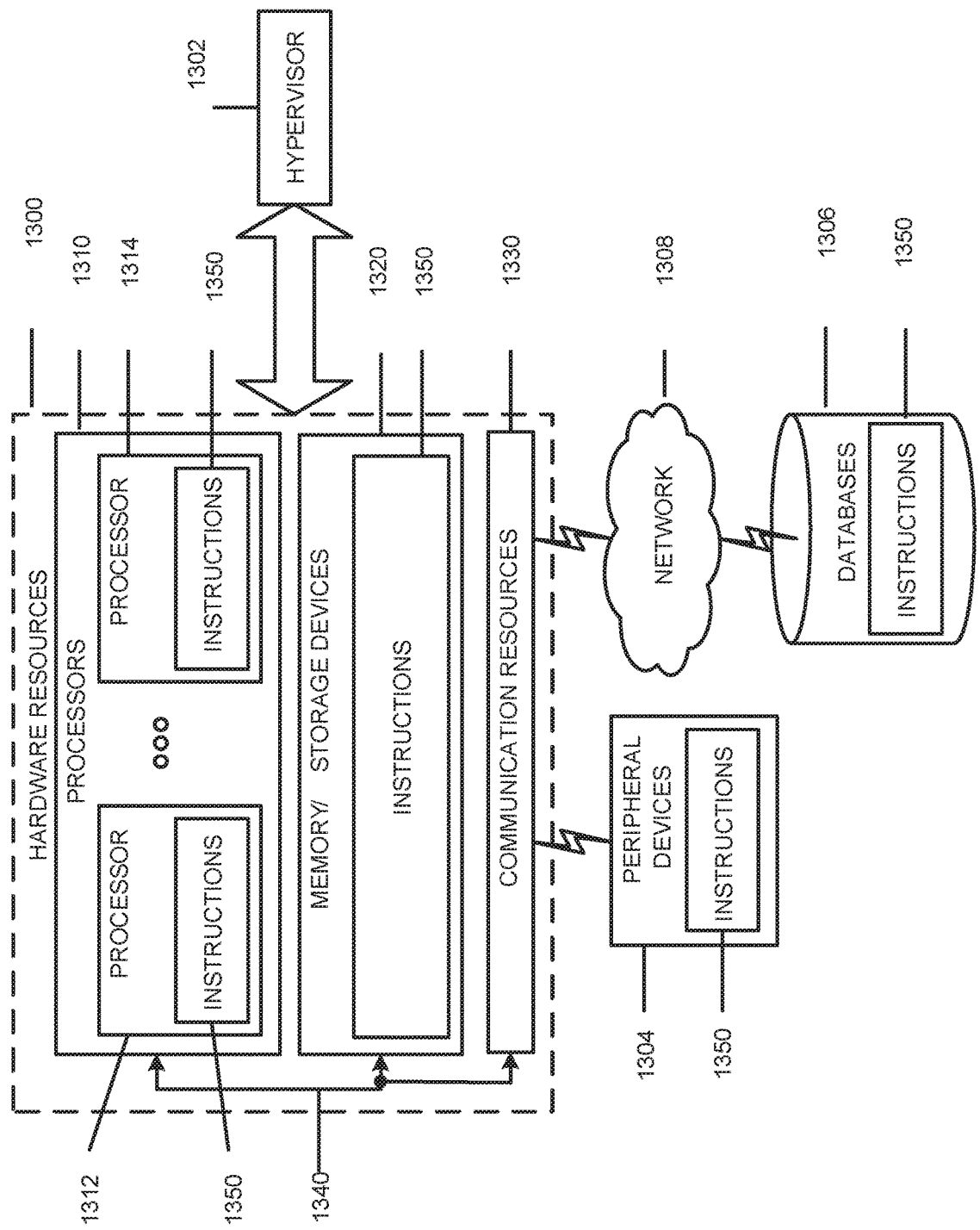
FIG. 13 is a block diagram illustrating components able to read instructions from a machine-readable or computer-readable medium in accordance with an example.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (e.g., NFV) is utilized, a hypervisor 1302 may be executed to provide an execution environment for one or more network slices/sub-slices to utilize the hardware resources 1300.

The processors 1310 may include, for example, a processor 1312 and a processor 1314. The processor(s) 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via USB), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

Figure 14:
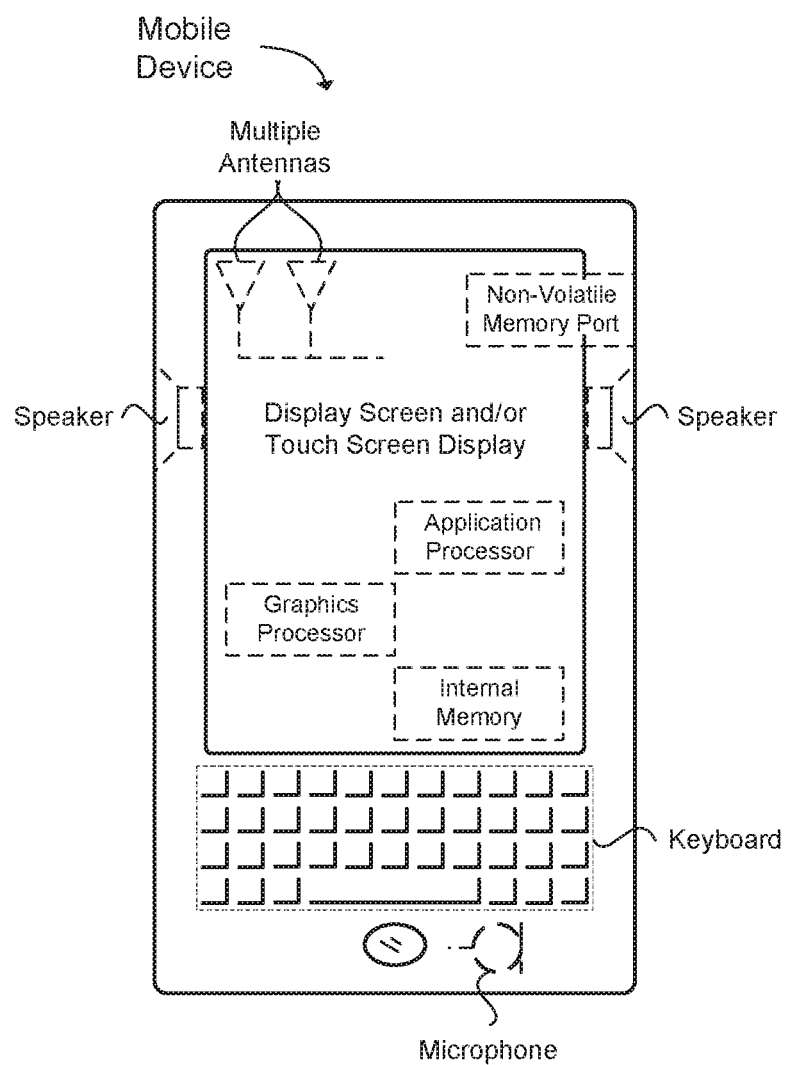
FIG. 14 illustrates a diagram of a wireless device (e.g., UE) in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

The following examples pertain to specific technology embodiments and point out specific features, elements, or actions that can be used or otherwise combined in achieving such embodiments.

Example 1 includes an apparatus of a Third Generation Partnership Project (3GPP) management system operable for peer-to-peer (P2P) edge computing in a fifth generation (5G) computing network, the apparatus comprising: one or more processors configured to: identify, at the 3GPP management system, a user plane function (UPF) based on quality of service (QoS) requirements; request, from an edge computing management system, deployment of an application server (AS); and request, at the 3GPP management system, a network functions virtualization (NFV) orchestrator (NFVO) to connect the UPF and the AS based on the QoS requirements; and a memory interface configured to store the QoS requirements in a memory.

Example 2 includes the apparatus of Example 1, wherein the one or more processors are further configured to: select, at the 3GPP management system, the UPF based on a geographical location of one or more of: the UPF, or a new radio node B (gNB) for a user equipment (UE).

Example 3 includes the apparatus of Example 1, wherein the one or more processors are further configured to: select, at the 3GPP management system, a data center of the UPF based on one or more of: the QoS requirements, or a geographical location of the UPF.

Example 4 includes the apparatus of Example 1, wherein the one or more processors are further configured to: receive, at the 3GPP management system, the QoS requirements for a connection between the UPF and the AS.

Example 5 includes the apparatus of Example 1, wherein the one or more processors are further configured to: insert, at the 3GPP management system, an uplink classifier in the UPF to divert user plane traffic from a user equipment (UE) to the UPF.

Example 6 includes the apparatus of Example 1, wherein the one or more processors are further configured to: identify, at the 3GPP management system, an identifier of the UPF; and send, from the 3GPP management system, the identifier of the UPF to one or more of the NFVO or the edge computing management system.

Example 7 includes the apparatus of any of Examples 1 to 6, wherein one or more of the edge computing management system or the NFVO are non-3GPP network elements.

Example 8 includes an apparatus of an edge computing system operable for peer-to-peer (P2P) edge computing in a fifth generation (5G) computing network, the apparatus comprising: one or more processors configured to: request, from a third generation partnership project (3GPP) management system, deployment of a user plane function (UPF); receive, at the edge computing system, a request for deployment of an application server (AS); identify, at the edge computing system, the AS based on quality of service (QoS) requirements; and request, at the 3GPP management system, a network functions virtualization (NFV) orchestrator (NFVO) to connect the UPF and the AS based on the QoS requirements; and a memory interface configured to store the QoS requirements in a memory.

Example 9 includes the apparatus of Example 8, wherein the one or more processors are further configured to: select, at the edge computing system, the AS based on a geographical location of one or more of: the UPF, or a new radio node B (gNB) for a user equipment (UE).

Example 10 includes the apparatus of Example 8, wherein the one or more processors are further configured to: select, at the edge computing system, a data center of the AS based on one or more of: the QoS requirements, or a geographical location of the UPF.

Example 11 includes the apparatus of Example 8, wherein the one or more processors are further configured to: receive, at the edge computing system, the QoS requirements for a connection between the UPF and the AS.

Example 12 includes the apparatus of Example 8, wherein the one or more processors are further configured to: receive, from the 3GPP management system, the identifier of the UPF.

Example 13 includes the apparatus of Example 8, wherein the one or more processors are further configured to: identify, at the edge computing system, an identifier of the AS; and send, from the edge computing system, the identifier of the AS to one or more of the NFVO or the 3GPP management system.

Example 14 includes the apparatus of any of Examples 8 to 13, wherein one or more of the edge computing management system or the NFVO are non-3GPP network elements.

Example 15 includes at least one machine readable storage medium having instructions embodied thereon for edge computing in a fifth generation (5G) computing network, the instructions when executed by one or more processors at a Third Generation Partnership Project (3GPP) management system perform the following: identifying, at the 3GPP management system, a user plane function (UPF) based on quality of service (QoS) requirements; requesting, from an edge computing management system, deployment of an application server (AS); and requesting, at the 3GPP management system, a network functions virtualization (NFV) orchestrator (NFVO) to connect the UPF and the AS based on the QoS requirements.

Example 16 includes the at least one machine readable storage medium of Example 15, further comprising instructions that when executed perform:
selecting, at the 3GPP management system, the UPF based on a geographical location of one or more of the UPF, or a new radio node B (gNB) for a user equipment (UE).

Example 17 includes the at least one machine readable storage medium of Example 15, further comprising instructions that when executed perform: selecting, at the 3GPP management system, a data center of the UPF based on one or more of: the QoS requirements, or a geographical location of the UPF.

Example 18 includes the at least one machine readable storage medium of Example 15, further comprising instructions that when executed perform: receiving, at the 3GPP management system, the QoS requirements for a connection between the UPF and the AS.

Example 19 includes the at least one machine readable storage medium of Example 15, further comprising instructions that when executed perform: inserting, at the 3GPP management system, an uplink classifier in the UPF to divert user plane traffic from a user equipment (UE) to the UPF.

Example 20 includes the at least one machine readable storage medium of any of Examples 15 to 19, further comprising instructions that when executed perform: identifying, at the 3GPP management system, an identifier of the UPF; and sending, from the 3GPP management system, the identifier of the UPF to one or more of the NFVO or the edge computing management system.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a Third Generation Partnership Project (3GPP) management system operable for peer-to-peer (P2P) edge computing in a fifth generation (5G) computing network, the apparatus comprising:
one or more processors configured to:
identify, at the 3GPP management system, a user plane function (UPF) based on quality of service (QoS) requirements;
request, from an edge computing management system, deployment of an application server (AS); and
request, at the 3GPP management system, a network functions virtualization (NFV) orchestrator (NFVO) to connect the UPF and the AS based on the QoS requirements; and
a memory interface configured to store the QoS requirements in a memory.

2. The apparatus of claim 1, wherein the one or more processors are further configured to:
select, at the 3GPP management system, the UPF based on a geographical location of one or more of: the UPF, or a new radio node B (gNB) for a user equipment (UE).

3. The apparatus of claim 1, wherein the one or more processors are further configured to:
select, at the 3GPP management system, a data center of the UPF based on one or more of: the QoS requirements, or a geographical location of the UPF.

4. The apparatus of claim 1, wherein the one or more processors are further configured to:
receive, at the 3GPP management system, the QoS requirements for a connection between the UPF and the AS.

5. The apparatus of claim 1, wherein the one or more processors are further configured to:
insert, at the 3GPP management system, an uplink classifier in the UPF to divert user plane traffic from a user equipment (UE) to the UPF.

6. The apparatus of claim 1, wherein the one or more processors are further configured to:
identify, at the 3GPP management system, an identifier of the UPF; and
send, from the 3GPP management system, the identifier of the UPF to one or more of the NFVO or the edge computing management system.

7. The apparatus of claim 1, wherein one or more of the edge computing management system or the NFVO are non-3GPP network elements.

8. At least one non-transitory machine readable storage medium having instructions embodied thereon for edge computing in a fifth generation (5G) computing network, the instructions when executed by one or more processors at a Third Generation Partnership Project (3GPP) management system perform the following:
- identifying, at the 3GPP management system, a user plane function (UPF) based on quality of service (QoS) requirements;
- requesting, from an edge computing management system, deployment of an application server (AS); and
- requesting, at the 3GPP management system, a network functions virtualization (NFV) orchestrator (NFVO) to connect the UPF and the AS based on the QoS requirements.

9. The at least one machine readable storage medium of claim 8, further comprising instructions that when executed perform:
- selecting, at the 3GPP management system, the UPF based on a geographical location of one or more of: the UPF, or a new radio node B (gNB) for a user equipment (UE).

10. The at least one machine readable storage medium of claim 8, further comprising instructions that when executed perform:
- selecting, at the 3GPP management system, a data center of the UPF based on one or more of: the QoS requirements, or a geographical location of the UPF.

11. The at least one machine readable storage medium of claim 8, further comprising instructions that when executed perform:
- receiving, at the 3GPP management system, the QoS requirements for a connection between the UPF and the AS.

12. The at least one machine readable storage medium of claim 8, further comprising instructions that when executed perform:
- inserting, at the 3GPP management system, an uplink classifier in the UPF to divert user plane traffic from a user equipment (UE) to the UPF.

13. The at least one machine readable storage medium of claim 8, further comprising instructions that when executed perform:
- identifying, at the 3GPP management system, an identifier of the UPF; and
- sending, from the 3GPP management system, the identifier of the UPF to one or more of the NFVO or the edge computing management system.

* * * * *